(12) United States Patent
Lu et al.

(10) Patent No.: US 12,407,608 B2
(45) Date of Patent: Sep. 2, 2025

(54) METHOD AND APPARATUS FOR PROCESSING CONTROL PACKET IN COLLECTIVE COMMUNICATION SYSTEM, DEVICE, AND SYSTEM

(71) Applicant: HUAWEI TECHNOLOGIES CO., LTD., Guangdong (CN)

(72) Inventors: Zhao Lu, Shenzhen (CN); Wenjin Gou, Hangzhou (CN); Sicong Li, Hangzhou (CN); Zhaohui Ding, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/062,667

(22) Filed: Dec. 7, 2022

(65) Prior Publication Data

US 2023/0106425 A1    Apr. 6, 2023

Related U.S. Application Data

(63) Continuation of application No. PCT/CN2021/087948, filed on Apr. 17, 2021.

(30) Foreign Application Priority Data

Jun. 8, 2020    (CN) .......................... 202010514291.1
Jul. 31, 2020    (CN) .......................... 202010760361.1

(51) Int. Cl.
*H04L 45/00* (2022.01)
*H04L 45/12* (2022.01)
*H04L 45/42* (2022.01)

(52) U.S. Cl.
CPC .......... *H04L 45/566* (2013.01); *H04L 45/123* (2013.01); *H04L 45/42* (2013.01)

(58) Field of Classification Search
CPC ..... H04L 45/123; H04L 45/122; H04L 45/42; H04L 45/566; G06F 16/903; G06F 9/50;
(Continued)

(56) References Cited

U.S. PATENT DOCUMENTS 10,432,669 B1    10/2019    Badhwar et al.
2007/0165603 A1 *   7/2007    Yokobori ............ H04L 12/4645
                                                       370/352
(Continued)

FOREIGN PATENT DOCUMENTS

CN    101465782 A    6/2009
CN    110233798 A    9/2019
(Continued)

OTHER PUBLICATIONS

Extended European Search Report in European Appln No. 21822429.3, dated Oct. 13, 2023, 8 pages.
(Continued)

*Primary Examiner* — Rachel J Hackenberg
(74) *Attorney, Agent, or Firm* — Fish & Richardson P.C.

(57) ABSTRACT

The present disclosure relates to methods and apparatuses for processing a control packet in a collective communication system, where the collective communication system includes a switch network and multiple computing nodes, and the switch network includes a first switch. In one example method, the first switch forwards a query packet transmitted by a source node to a destination node, where the query packet is generated by the source node based on a context of the collective communication system. Then, the first switch forwards a notification packet transmitted by the destination node to the source node, where the notification packet carries an in-network computing capability of the switch network.

20 Claims, 10 Drawing Sheets

(58) Field of Classification Search
CPC ............. G06F 2209/509; G06F 3/0631; G06F 9/5027; G06F 9/5083
See application file for complete search history.

(56) References Cited

U.S. PATENT DOCUMENTS

| | | | |
|---|---|---|---|
| 2011/0149844 A1 | 6/2011 | G. et al. | |
| 2012/0327952 A1* | 12/2012 | Huang | H04L 12/413 370/419 |
| 2014/0359089 A1* | 12/2014 | Davis | H04L 49/25 709/221 |
| 2016/0094667 A1* | 3/2016 | Jani | G06F 9/4411 709/202 |
| 2016/0315814 A1* | 10/2016 | Thirumurthi | H04L 67/1031 |
| 2018/0183855 A1* | 6/2018 | Sabella | H04L 67/04 |
| 2020/0067812 A1 | 2/2020 | Malhotra et al. | |
| 2020/0133531 A1* | 4/2020 | Subramaniam | G06F 9/5027 |
| 2022/0109746 A1* | 4/2022 | Lindheimer | H04L 69/24 |
| 2022/0417323 A1* | 12/2022 | Julien | H04L 67/51 |

FOREIGN PATENT DOCUMENTS

| | | |
|---|---|---|
| CN | 111143427 A | 5/2020 |
| CN | 111245651 A | 6/2020 |
| EP | 4052442 B1 | 7/2024 |

OTHER PUBLICATIONS

Venkata et al., "Accelerating OpenSHMEM Collectives Using In-Network Computing Approach," 2019 31st International Symposium on Computer Architecture and High Performance Computing (SBAC-PAD), Dec. 5, 2019, 8 pages.

International Search Report and Written Opinion in International Appln. No. PCT/CN2021/087948, mailed on Jul. 2, 2021, 18 pages (with English translation).

EP Communication Pursuant to Article 94(3) EPC in European Appln. No. 21822429.3, mailed on Jul. 4, 2025, 7 pages.

* cited by examiner

METHOD AND APPARATUS FOR PROCESSING CONTROL PACKET IN COLLECTIVE COMMUNICATION SYSTEM, DEVICE, AND SYSTEM

CROSS-REFERENCE TO RELATED APPLICATIONS

This application is a continuation of International Application No. PCT/CN2021/087948, filed on Apr. 17, 2021, which claims priority to Chinese Patent Application No. 202010514291.1, filed on Jun. 8, 2020, and Chinese Patent Application No. 202010760361.1, filed on Jul. 31, 2020, all of which are hereby incorporated by reference in their entireties.

TECHNICAL FIELD

This application relates to the field of information technologies, and in particular, to a method and an apparatus for processing a control packet in a collective communication system, a device, a system, and a computer-readable storage medium.

BACKGROUND

With continuous development of high-performance computing (HPC) and artificial intelligence (AI) technologies, many new applications emerge. Users are increasingly pursuing ultimate execution efficiency and performance in various application scenarios. Collective communication is a mainstream communication manner in various application scenarios, and is also a future development trend. A large quantity of point-to-point operations are replaced by a collective operation in the collective communication, so that running performance of an application can be improved.

In a collective communication system, when performing a collective operation, a computing node usually occupies a large quantity of computing resources, for example, occupies a large quantity of central processing unit (CPU) resources. Based on this, an in-network computing (INC) solution is proposed in the industry. In-network computing is specifically to offload the collective operation by using an ultimate forwarding capability and a strong computing capability of an in-network computing device such as a switch, thereby greatly improving collective operation performance and reducing CPU load of the computing node.

Currently, a typical in-network computing solution in the industry is to deploy an independent manager at a management node, where the manager includes a subnet manager and an aggregation manager; then obtain a network topology and an in-network computing capability in a communicator through the manager; and perform INC offloading on subsequent service packets based on the network topology and the in-network computing capability.

However, a deployment process of the manager is very complex, and maintenance is difficult. On a large-scale network, the deployment complexity and maintenance difficulty are more obvious. Based on this, the industry urgently needs to provide a simpler and more efficient in-network computing solution, to optimize performance of a collective communication system.

SUMMARY

This application provides a method for processing a control packet in a collective communication system. In the method, the control packet such as a query packet, a notification packet or the like is directly sent and received by multiplexing a context of the collective communication system, and an in-network computing capability is queried based on the control packet. As a result, INC offloading is performed on subsequent service packets based on the in-network computing capability, thereby avoiding repeated creation and obtaining of a related resource, and decoupling dependency on a control plane manager and a computing node daemon. An in-network computing solution implemented by using this method is more maintainable, flexible, and universal. This application further provides an apparatus, a device, a system a computer-readable storage medium, and a computer program product corresponding to the foregoing method.

According to a first aspect, this application provides a method for processing a control packet in a collective communication system. The collective communication system includes a switch network (also referred to as a switch matrix, switch fabric) and a plurality of computing nodes. The switch network is a network formed by at least one switch. The switch network may include one switch, or may include a plurality of switches. The switch network may further be classified into a single-layer switch network and a multi-layer switch network based on a network architecture.

The single-layer switch network includes a single-layer switch, namely, an access layer switch. The single-layer switch includes one or more switches. Each switch in the single-layer switch may be directly connected to a computing node, to connect the computing node to the network.

The multi-layer switch network includes an upper-layer switch and a lower-layer switch. The upper-layer switch refers to a switch connected to a switch, and the upper-layer switch is usually not directly connected to a computing node. The lower-layer switch refers to a switch that can be directly connected to a computing node. Therefore, the lower-layer switch is also called an access layer switch. For example, the multi-layer switch network may be a leaf-spine (leaf-spine) architecture. The upper-layer switch is a spine switch, and the lower-layer switch is a leaf switch. The spine switch is no longer a large box switch in a three-layer architecture, but a high port density switch. The leaf switch functions as an access layer to provide a network connection for a computing node such as a terminal and a server and connects to the spine switch at the same time.

The switch network includes a first switch. The first switch may be a switch in the single-layer switch network, or may be a switch in the multi-layer switch network, for example, a leaf switch or a spine switch. An application that supports collective communication may multiplex a context of the collective communication system to initiate a control packet procedure, to query information such as an in-network computing capability of the switch network, so as to provide help for in-network computing (computing offloading).

Specifically, a source node may generate a query packet based on the context of the collective communication system, where the query packet is used to request to query the in-network computing capability of the switch network. The first switch may forward the query packet transmitted by the source node to a destination node. The source node and the destination node are specifically different computing nodes in the collective communication system. The destination node may generate a notification packet, where the notification packet carries an in-network computing capability of the switch. The first switch may forward the notification packet transmitted by the destination node to the source node, to notify the in-network computing capability of the switch network to the source node.

The in-network computing capability of the switch network includes an in-network computing capability of one or more switches through which the query packet passes. One or more computing nodes of the collective communication system may serve as a source node to send a query packet to a destination node. When these query packets pass through all switches in the switch network, the in-network computing capability that is of the switch network and that is returned by the destination node based on a notification packet refers to in-network computing capabilities of all the switches in the switch network. When these query packets pass through some switches in the switch network, the in-network computing capability of the switch network returned by the destination node by using the notification packet specifically refers to in-network computing capabilities of the some switches.

In the method, the control packet such as the query packet, the notification packet or the like is directly sent and received by multiplexing the context of the collective communication system, and the in-network computing capability is queried based on the control packet. As a result, INC offloading is performed on subsequent service packets based on the in-network computing capability, thereby avoiding repeated creation and obtaining of a related resource, and decoupling dependency on a control plane manager and a computing node daemon. Based on this, an in-network computing solution provided in this embodiment of this application is more maintainable, flexible, and universal.

Further, the method supports multiplexing of an existing network protocol channel, for example, an Ethernet channel, does not depend on a communication standard, does not need to use a remote direct memory access (remote direct memory access, RDMA) infiniband (infiniband, IB), and does not need to additionally configure an 1B switch. Therefore, costs of the in-network computing solution can be greatly reduced.

In addition, in the method, a daemon does not need to be run on the computing node, and only an INC dynamic library (INC lib) needs to be provided, and a specified application programming interface (application programming interface, API) in the INC lib is invoked in a collective operation communicator to implement control packet service logic.

In some possible implementations, when the query packet passes through the first switch, the first switch may add an in-network computing capability of the first switch to the query packet, for example, add the in-network computing capability of the switch to a query field of the query packet. Then, the first switch forwards, to the destination node, the query packet to which the in-network computing capability of the first switch is added. Correspondingly, the destination node summarizes the in-network computing capability of the first switch based on the query packet to which the in-network computing capability of the first switch is added, to obtain the in-network computing capability of the switch network, and then adds the in-network computing capability of the switch network to the notification packet.

In this way, the in-network computing capability of the switch network is queried by using the simple and efficient method, which provides help for the in-network computing solution of the collective communication.

In some possible implementations, the in-network computing capability of the first switch includes a collective operation type supported by the first switch and/or a data type supported by the first switch. The first switch adds, to the query packet, the collective operation type supported by the first switch and/or the data type supported by the first switch, so that the computing node determines, based on the collective operation type and the data type that are/is supported by the switch, whether to perform computing offloading in the first switch, thereby implementing in-network computing.

The collective operation type may include any one or more of broadcasting from one member to all members in a group, data gathering by one member from all members in a group, data scattering from one member to all members in a group, a data scattering/gathering operation from all members in a group to/by all members, a global reduction (global reduction) operation, a combined reduction (combined reduction) and scattering operation, and a search operation on all members in a group. The member refers to a process in a process group.

The data type may include any one or more of a byte, a 16-bit integer (short), a 32-bit integer (int), a 64-bit integer (long), a floating point (float), a double-precision floating point (double), a Boolean (Boolean), a character (char), and the like.

In this way, the computing node may determine an in-network computing policy based on the collective operation type supported by the first switch and/or the data type supported by the first switch. Specifically, the computing node may compare a collective operation type of the current collective communication with the collective operation type supported by the first switch, and compare a data type of the current collective communication with the data type supported by the first switch. When the collective operation type supported by the first switch includes the collective operation type of the current collective communication, and the data type supported by the first switch includes the data type of the current collective communication, the computing node may offload computing to the first switch; otherwise, the computing node does not offload computing to the first switch. Therefore, the computing node can be prevented from performing an additional operation when the first switch does not support the collective operation type or the data type of the current collective communication, thereby improving efficiency of the computing node.

In some possible implementations, the in-network computing capability of the first switch includes a size of a remaining available resource for in-network computing of the first switch. The size of the remaining available resource for in-network computing of the first switch may be represented by using a maximum value of a quantity of concurrent hosts of the first switch, namely, a local group size (local group size).

The in-network computing capability of the first switch may include any one or more of the collective operation type supported by the first switch, the data type supported by the first switch, and the size of the remaining available resource for in-network computing of the first switch. When the first switch supports various collective operation types by default, the in-network computing capability of the first switch may not include the collective operation type supported by the first switch. When the first switch supports various data types by default, the in-network computing capability of the first switch may not include the data type supported by the first switch.

The first switch adds the size of the remaining available resource for in-network computing of the first switch to the query packet, so that the computing node determines the in-network computing policy based on the size of the remaining available resource for in-network computing. For example, computing is totally offloaded to the first switch, or computing is partially offloaded to the first switch, so that an in-network computing resource of the first switch is fully utilized.

In some possible implementations, the first switch may further establish an entry based on a hop count of the query packet, where the entry is used by the switch to perform computing offloading on service packets. Specifically, in a service packet procedure, the first switch may identify whether the service packets are in-network computing packets. If the service packets are the in-network computing packets, the in-network computing packet is matched with the entry established in the control packet procedure. If the matching succeeds, computing offloading is performed on the service packets. In this way, the in-network computing resource can be allocated in real time. Further, after the collective communication is completed, the foregoing entry may be further cleared, and the in-network computing resource may be released. In this way, resource utilization can be optimized.

In some possible implementations, the first switch is directly connected to the source node and the destination node. Correspondingly, the first switch may receive the query packet sent by the source node, and forward the query packet to the destination node. Then, the first switch receives the notification packet sent by the destination node, and forwards the notification packet to the source node. Because a topology of the switch network is simple, the query packet and the notification packet can be sent and received through one-time forwarding. This improves efficiency of obtaining the in-network computing capability.

In some possible implementations, the switch network further includes a second switch and/or a third switch. The second switch is configured to connect the first switch to the source node, and the third switch is configured to connect the first switch to the destination node. The second switch may be one switch, or may be a plurality of switches. Similarly, the third switch may also be one switch or a plurality of switches.

When the switch network includes the second switch but does not include the third switch, the first switch receives the query packet forwarded by the second switch, and forwards the query packet to the destination node. Then, the first switch receives the notification packet sent by the destination node, and forwards the notification packet to the second switch.

When the switch network includes the third switch but does not include the second switch, the first switch receives the query packet sent by the source node, and forwards the query packet to the third switch. Then, the first switch receives the notification packet forwarded by the third switch, and forwards the notification packet to the source node.

When the switch network includes both the second switch and the third switch, the first switch receives the query packet forwarded by the second switch, and forwards the query packet to the third switch. Then, the first switch receives the notification packet forwarded by the third switch, and forwards the notification packet to the second switch.

The first switch forwards a packet to another switch, and then forwards the packet by using the another switch. In this way, the query packet can be transmitted by the source node to the destination node in an indirect manner, and the notification packet can be transmitted by the destination node to the source node. Therefore, the in-network computing capability of the switch network is obtained by receiving and sending the control packet.

The first switch and the second switch may be vertically connected, that is, the first switch and the second switch are switches at different levels. The first switch and the second switch may also be horizontally connected, that is, the first switch and the second switch may be switches at a same level, for example, may be switches at an access layer. Similarly, the first switch and the third switch may also be vertically connected or horizontally connected.

In some possible implementations, the switch network includes a single-layer switch, for example, a top of rack (top of rack, ToR) switch. Therefore, the first switch is the foregoing single-layer switch. In this way, interconnection between the computing node such as a server and the first switch in a cabinet can be implemented. When sending the notification packet, the first switch directly forwards the notification packet to the source node, so that high communication performance is achieved.

In some possible implementations, the switch network includes upper-layer switches and lower-layer switches. For example, the switch network may be a leaf-spine (leaf-spine) architecture, including the upper-layer switches located at an upper layer, namely, spine switches, and the lower-layer switches located at a lower layer, namely, leaf switches. The first switch may be a switch in the lower-layer switches, for example, may be a leaf switch.

Specifically, the first switch may determine a target switch from the upper-layer switches based on sizes of remaining available resources for in-network computing of the upper-layer switches, and then add a size of a remaining available resource for in-network computing of the target switch to the notification packet. Then, the first switch forwards, to the source node, the notification packet to which the size of the remaining available resource for in-network computing of the target switch is added. In this way, in a subsequent service packet procedure, the computing node may further calculate the size of the remaining available resource for in-network computing of the target switch, and determine an in-network computing policy, which is specifically a policy of performing computing offloading on the target switch.

In some possible implementations, the first switch may determine the target switch from the upper-layer switches by using a load balancing policy based on the sizes of the remaining available resources for in-network computing of the upper-layer switches. In this way, overload of the upper-layer switch can be avoided, and collective communication performance is affected.

In some possible implementations, when the first switch is the lower-layer switch, the first switch may further send a switch query packet to the upper-layer switch, where the switch query packet is used to query the size of the remaining available resource for in-network computing of the upper-layer switch; and then receive a switch notification packet sent by the upper-layer switch, where the switch notification packet is used to notify the size of the remaining available resource for in-network computing of the upper-layer switch. In this way, a reference may be provided for the lower-layer switch to determine the target switch.

In some possible implementations, when the first switch is the upper-layer switch, the first switch may further receive a switch query packet sent by the lower-layer switch, where the switch query packet is used to query the size of the remaining available resource for in-network computing of the first switch; and then send a switch notification packet to the lower-layer switch, where the switch notification packet is used to notify the size of the remaining available resource for in-network computing of the first switch. In this way, the size of the remaining available resource for in-network computing of the upper-layer switch is obtained by sending and receiving the switch query packet and the switch notification packet, to provide a reference for the lower-layer switch to determine a target switch.

In some possible implementations, the context of the collective communication system includes a context of an application or a context of a communicator. By multiplexing these contexts, repeated creation and obtaining of related resources can be avoided, and dependency on the control plane manager and the computing node daemon is decoupled.

In some possible implementations, the plurality of computing nodes include a master node and at least one child node. The source node may be the child node, and correspondingly, the destination node is the master node. In some embodiments, the source node may alternatively be the master node, and the destination node may alternatively be the child node.

According to a second aspect, this application provides a method for processing a control packet in a collective communication system. The collective communication system includes a switch network and a plurality of computing nodes, the switch network includes at least one switch, and the plurality of computing nodes includes a first computing node and a second computing node.

Specifically, the first computing node receives a query packet forwarded by one or more switches in the switch network, where the query packet is used to request to query an in-network computing capability of the switch network, and the query packet is generated by the second computing node based on a context of the collective communication system. Then, the first computing node generates a notification packet based on the query packet, where the notification packet carries the in-network computing capability of the switch network. Then, the first computing node sends the notification packet to the second computing node.

In the method, the control packet such as the query packet, the notification packet or the like is directly sent and received by multiplexing the context of the collective communication system, and the in-network computing capability is queried based on the control packet. As a result, INC offloading is performed on subsequent service packets based on the in-network computing capability, thereby avoiding repeated creation and obtaining of a related resource, and decoupling dependency on a control plane manager and a computing node daemon. Based on this, an in-network computing solution provided in this embodiment of this application is more maintainable, flexible, and universal.

In some possible implementations, the in-network computing capability of the switch network that is carried by the notification packet is specifically obtained from the query packet forwarded by the one or more switches. Each time the query packet passes through a switch, the switch adds an in-network computing capability of the switch to the query packet. In this way, the computing node may obtain the in-network computing capability of the switch network by sending the query packet and receiving the notification packet, thereby avoiding repeated creation and obtaining of a related resource, and decoupling dependency on the control plane manager and the computing node daemon.

In some possible implementations, the query packet forwarded by the switch includes the in-network computing capability of the switch that is added by the switch, and the first computing node may obtain the in-network computing capability of the switch network based on the in-network computing capability of the one or more switches in the query packet forwarded by the one or more switches. In this way, the in-network computing capability of the switch network can be obtained by simply sending, receiving, and processing the control packet.

In some possible implementations, the first computing node is a master node or a child node. When the first computing node is the master node, the second computing node may be a child node. When the first computing node is the child node, the second computing node may be a master node.

According to a third aspect, this application provides a method for processing a control packet in a collective communication system. The collective communication system includes a switch network and a plurality of computing nodes, the switch network includes at least one switch, and the plurality of computing nodes includes a first computing node and a second computing node.

Specifically, the second computing node generates a query packet based on a context of the collective communication system, where the query packet is used to request to query an in-network computing capability of the switch network. Then, the second computing node sends the query packet to the first computing node by using one or more switches in the switch network. Then, the second computing node receives a notification packet that is forwarded by the first computing node by using the one or more switches and generated by the first computing node based on the query packet, where the notification packet carries the in-network computing capability of the switch network.

In the method, the control packet such as the query packet, the notification packet or the like is directly sent and received by multiplexing the context of the collective communication system, and the in-network computing capability is queried based on the control packet. As a result, INC offloading is performed on subsequent service packets based on the in-network computing capability, thereby avoiding repeated creation and obtaining of a related resource, and decoupling dependency on a control plane manager and a computing node daemon. Based on this, an in-network computing solution provided in this embodiment of this application is more maintainable, flexible, and universal.

In some possible implementations, the in-network computing capability of the switch network is obtained by the first computing node based on an in-network computing capability of the one or more switches in the query packet forwarded by the one or more switches. This helps the computing node obtain the in-network computing capability of the switch network by receiving and sending the control packet.

In some possible implementations, the second computing node is a master node or a child node. When the second computing node is the master node, the first computing node may be a child node. When the second computing node is the child node, the first computing node may be a master node.

According to a fourth aspect, this application provides an apparatus for processing a control packet in a collective communication system. The collective communication system includes a switch network and a plurality of computing nodes, and the switch network includes a first switch. The apparatus includes:

a communication module, configured to forward a query packet transmitted by a source node to a destination node, where the query packet is used to request to query an in-network computing capability of the switch network, the query packet is generated by the source node based on a context of the collective communication system, the source node and the destination node are different nodes in the plurality of computing nodes, and the communication module is further configured to forward a notification packet transmitted by the destination node to the source node, where the notification packet carries the in-network computing capability of the switch network.

In some possible implementations, the apparatus further includes:
a processing module, configured to add an in-network computing capability of the first switch to the query packet when receiving the query packet; and
the communication module is specifically configured to:
forward, to the destination node, the query packet to which the in-network computing capability of the first switch is added.

In some possible implementations, the in-network computing capability of the first switch includes a collective operation type and/or a data type that are/is supported by the first switch.

In some possible implementations, the in-network computing capability of the first switch includes a size of a remaining available resource for in-network computing of the first switch.

In some possible implementations, the apparatus further includes:
a processing module, configured to establish an entry based on a hop count of the query packet, where the entry is used by the first switch to perform computing offloading on service packets.

In some possible implementations, the first switch is directly connected to the source node and the destination node; and
the communication module is specifically configured to:
receive the query packet sent by the source node, and forward the query packet to the destination node; and
receive the notification packet sent by the destination node, and forward the notification packet to the source node.

In some possible implementations, the switch network further includes a second switch and/or a third switch, the second switch is configured to connect the first switch to the source node, and the third switch is configured to connect the first switch to the destination node; and
the communication module is specifically configured to:
receive the query packet sent by the source node, and forward the query packet to the third switch; and
receive the notification packet forwarded by the third switch, and forward the notification packet to the source node; or
receive the query packet forwarded by the second switch, and forward the query packet to the destination node; and
receive the notification packet sent by the destination node, and forward the notification packet to the second switch; or
receive the query packet forwarded by the second switch, and forward the query packet to the third switch; and
receive the notification packet forwarded by the third switch, and forward the notification packet to the second switch.

In some possible implementations, the switch network includes a single-layer switch, and the first switch is the single-layer switch; and
the communication module is specifically configured to:
forward the notification packet to the source node.

In some possible implementations, the switch network includes upper-layer switches and a lower-layer switch, and the first switch is the lower-layer switch:
the apparatus further includes:
a processing module, configured to determine a target switch from the upper-layer switches based on sizes of remaining available resources for in-network computing of the upper-layer switches, and add a size of a remaining available resource for in-network computing of the target switch to the notification packet; and
the communication module is specifically configured to:
forward, to the source node, the notification packet to which the size of the remaining available resource for in-network computing of the target switch is added.

In some possible implementations, the processing module is specifically configured to:
determine the target switch from the upper-layer switches by using a load balancing policy based on the sizes of the remaining available resources for in-network computing.

In some possible implementations, the communication module is further configured to:
send a switch query packet to the upper-layer switch, where the switch query packet is used to query the size of the remaining available resource for in-network computing of the upper-layer switch; and
receive a switch notification packet sent by the upper-layer switch, where the switch notification packet is used to notify the size of the remaining available resource for in-network computing of the upper-layer switch.

In some possible implementations, the switch network includes an upper-layer switch and a lower-layer switch, and the first switch is the upper-layer switch; and the communication module is further configured to:
receive a switch query packet sent by the lower-layer switch, where the switch query packet is used to query the size of the remaining available resource for in-network computing of the first switch; and
send a switch notification packet to the lower-layer switch, where the switch notification packet is used to notify the size of the remaining available resource for in-network computing of the first switch to the lower-layer switch.

In some possible implementations, the context of the collective communication system includes a context of an application or a context of a communicator.

In some possible implementations, the plurality of computing nodes include a master node and at least one child node.

The source node is the child node, and the destination node is the master node.

Alternatively, the source node is the master node, and the destination node is the child node.

According to a fifth aspect, this application provides an apparatus for processing a control packet in a collective communication system. The collective communication system includes a switch network and a plurality of computing nodes, the switch network includes at least one switch, and the plurality of computing nodes includes a first computing node and a second computing node. The apparatus includes:
a communication module, configured to receive a query packet forwarded by one or more switches in the switch network, where the query packet is used to request to query an in-network computing capability of the switch network, and the query packet is generated by the second computing node based on a context of the collective communication system; and a generation module, configured to generate a notification packet based on the query packet, where the notification packet carries the in-network computing capability of the switch network, and the communication module is further configured to send the notification packet to the second computing node.

In some possible implementations, the query packet forwarded by the switch includes an in-network computing capability of the switch that is added by the switch, and the generation module is specifically configured to:

obtain the in-network computing capability of the switch network based on the in-network computing capability of the one or more switches in the query packet forwarded by the one or more switches; and generate the notification packet based on the in-network computing capability of the switch network.

In some possible implementations, the apparatus is deployed at the first computing node, and the first computing node is a master node or a child node.

According to a sixth aspect, this application provides an apparatus for processing a control packet in a collective communication system. The collective communication system includes a switch network and a plurality of computing nodes, the switch network includes at least one switch, and the plurality of computing nodes includes a first computing node and a second computing node. The apparatus includes:

a generation module, configured to generate a query packet based on a context of the collective communication system, where the query packet is used to request to query an in-network computing capability of the switch network; and a communication module, configured to send the query packet to the first computing node by using one or more switches in the switch network; and the communication module is further configured to receive a notification packet forwarded by the first computing node by using the one or more switches, where the notification packet carries the in-network computing capability of the switch network, and the notification packet is generated by the first computing node based on the query packet.

In some possible implementations, the apparatus is deployed at the second computing node, and the second computing node is a master node or a child node.

According to a seventh aspect, this application provides a switch. The switch includes a processor and a memory.

The processor is configured to execute instructions stored in the memory, so that the switch is enabled to perform the method according to the first aspect or any one of the implementations of the first aspect of this application.

According to an eighth aspect, this application provides a computing node. The computing node includes a processor and a memory.

The processor is configured to execute instructions stored in the memory, so that the computing node is enabled to perform the method according to the second aspect or any one of the implementations of the second aspect of this application.

According to a ninth aspect, this application provides a computing node. The computing node includes a processor and a memory.

The processor is configured to execute instructions stored in the memory, so that the computing node is enabled to perform the method according to the third aspect or any one of the implementations of the third aspect of this application.

According to a tenth aspect, this application provides a collective communication system. The collective communication system includes a switch network and a plurality of computing nodes, the switch network includes a first switch, and the plurality of computing nodes includes a first computing node and a second computing node.

The second computing node is configured to generate a query packet based on a context of the collective communication system, where the query packet is used to request to query an in-network computing capability of the switch network.

The first switch is configured to forward the query packet transmitted by the second computing node to the first computing node.

The first computing node is configured to generate a notification packet based on the query packet, where the notification packet carries the in-network computing capability of the switch network.

The first switch is further configured to forward the notification packet transmitted by the first computing node to the second computing node.

According to an eleventh aspect, this application provides a computer-readable storage medium, where the computer-readable storage medium stores instructions. The instructions instruct a device to perform the method for processing the control packet in the collective communication system according to any one of the implementations of the first aspect, the second aspect, or the third aspect.

According to a twelfth aspect, this application provides a computer program product including instructions. When the computer program product runs on a device, the device is enabled to perform the method for processing the control packet in the collective communication system according to the first aspect or any one of the implementations of the first aspect, the second aspect, or the third aspect.

In this application, on the basis of the implementations according to the foregoing aspects, the implementations may be further combined to provide more implementations.

BRIEF DESCRIPTION OF DRAWINGS

To describe the technical methods in embodiments of this application more clearly, the following briefly describes the accompanying drawings for embodiments.

DESCRIPTION OF EMBODIMENTS

Figure 1:
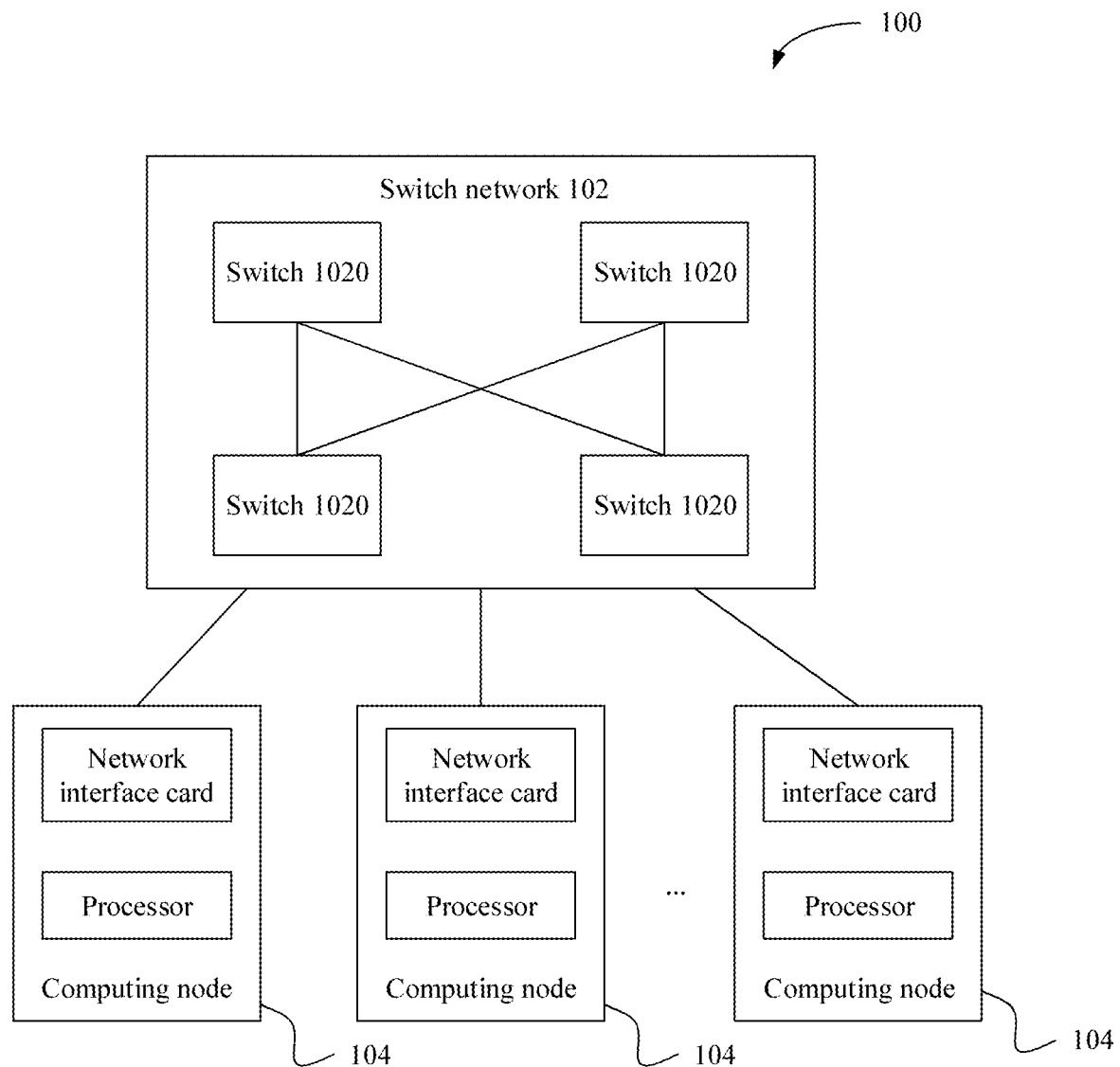
FIG. 1 is a diagram of an architecture of a collective communication system according to an embodiment of this application.

Terms "first" and "second" in embodiments of this application are merely intended for description, and shall not be understood as an indication or implication of relative importance or implicit indication of a quantity of indicated technical features. Therefore, a feature limited by "first" or "second" may explicitly or implicitly include one or more features.

First, some technical terms in embodiments of this application are described.

High-performance computing (HPC) uses an aggregation computing capability of a large quantity of processing units to solve complex problems, such as weather prediction, oil exploration, and nuclear explosion simulation. The aggregation computing capability of the large quantity of processing units may be an aggregation computing capability of a plurality of processors in a single machine, or may be an aggregation computing capability of a plurality of computers in a cluster.

Artificial intelligence (AI) is to run a computer program on a computer, so that the computer has an effect similar to human intelligence, so that the computer can assist humans or replace humans to solve problems. For example, artificial intelligence may be used to implement automated image detection, image recognition, audio detection, video surveillance, and the like.

Artificial intelligence generally includes two implementations. An implementation is an engineering approach, that is, a conventional programming technology is used, so that the computer presents an intelligent effect, regardless of whether the method is the same as a method used by a human or living organism. An implementation is a modeling approach, and is specifically a manner that is the same as or similar to a method used by the human or living organism, so that the computer presents an intelligent effect.

In some examples, the modeling approach may include simulating a genetic-evolution mechanism of the human or organism based on a generic algorithm (GA), or may include simulating an activity of nerve cells in a human or organism brain based on an artificial neural network (ANN).

With the continuous development of HPC and AI, some new applications emerge. Users are increasingly pursuing ultimate execution efficiency and performance of these applications. Based on this, collective communication is introduced in the industry, and a large quantity of point-to-point operations are replaced by a collective operation in the collective communication, thereby improving application performance.

The collective communication is to organize a communicator to serve a group of communication processes and complete a specific communication operation between the processes. The group of communication processes forms a process group, and the communicator comprehensively describes a relationship between the communication processes. The communicator specifically includes a process group, a context, a topology, and the like. The context refers to an environment in which a process is executed. The topology refers to distribution of computing nodes that execute processes.

The environment in which the process is executed specifically refers to variables and data on which the process depends during execution, including a register variable, a file opened by the process, memory information, and the like. The context is essentially a snapshot of the environment, which is an object used to store a state. Most functions written in a program are not independent and complete. When a function is used to implement a corresponding function, other external environment variables may be required. The context is used to assign values to variables in the external environment so that the function can run properly.

Each process is objectively unique and usually has a unique process identifier (pid). A same process may belong to only one process group, or may belong to a plurality of process groups (the process has respective numbers, namely, rank numbers, in different process groups). When a same process belongs to a plurality of process groups, considering a one-to-one correspondence between a process group and a communicator, the process may also belong to different communicators.

A specific operation (namely, a collective operation) between processes in a collective communication system is mainly a data distribution and synchronization operation. Collective communication based on a message passing interface (MPI) generally includes two communication modes: a one-to-many communication mode and a many-to-many communication mode.

A communication operation in the one-to-many mode may include broadcasting from one member to all members in a group, data gathering by one member from all members in a group, data scattering by one member to all members in a group, and the like. A communication operation in the many-to-many mode may include a data scattering/gathering operation from all members in a group to/by all members, a global reduction operation, a combined reduction and scattering operation, a search operation on all members in a group, and the like. Reduction refers to dividing a batch of data into small batches of data by using a function, for example, reducing elements in an array to a number by using an addition function.

An application may perform collective communication in a plurality of different communicators. For example, an application is deployed at a computing node 1 to a computing node N in a distributed manner, a process group on the computing node 1 to a computing node K may form a communicator, and a process group on a computing node K+1 to the computing node N may form another communicator, where N is a positive integer greater than 3, and K is a positive integer greater than or equal to 2. The two communicators have their own contexts. Similarly, the application itself has a context. The context of the application refers to an environment in which the application is executed. The context of the application may be considered as a global context, and a context of the communicator may be considered as a local context within the communicator.

In-network computing (INC) is a key optimization technology proposed in the industry for collective communication. Specifically, in-network computing refers to offloading a collective operation by using an extreme forwarding capability and a strong computing capability of a switch, thereby greatly improving collective operation performance and reducing load of a computing node.

For in-network computing, an implementation scheme based on a scalable hierarchical aggregation protocol (SHARP) is proposed in the industry. Specifically, a manager that runs independently is deployed at a management node, and the manager specifically includes a subnet manager (SM) and an aggregation manager (AM).

The SM obtains topology information of an aggregation node (AN), and then notifies the topology information to the AM. Then, the AM obtains an in-network computing capability of the AN, calculates a SHARP tree structure based on the topology information of the AN and the in-network computing capability of the AN, allocates and configures a reliable connected queue pair from an AN to an AN, and then configures SHARP tree information of all ANs based on the QP.

Next, a job scheduler starts a job and allocates a computing resource. Each allocated host executes a job initialization script and starts a SHARP daemon (SD). An SD numbered 0 (rank 0) (which may also be referred to as SD-0) sends job information to the AM, and the AM allocates a SHARP resource to the job. The AM allocates a quota for the job on the AN and sends a resource allocation description to the SD-0. The SD-C forwards the information to another SD. It should be noted that the another SD may start a job in parallel, for example, send job information to the AM, and the AM allocates a resource to the job, and allocates a quota to a corresponding AN.

In this way an MPI process may access the SD to obtain SHARP resource information, establish a connection based on the SHARP resource information, and then create a process group. Then, the MPI process sends an aggregation request to a SHARP tree, to implement in-network computing.

In the foregoing method, a manager such as an SM or an AM need to be deployed at a management node, and a network topology and INC resource information are obtained based on the SM and the AM, to implement in-network computing. A deployment process of the manager is complex and the manager is difficult to maintain. In a large-scale network, it is more difficult to deploy and maintain a manager.

In view of this, this embodiment of this application provides a method for processing a control packet in a collective communication system. The collective communication system includes a switch network and a plurality of computing nodes. The switch network includes at least one switch. A context of the collective communication system allows division of a communication space. Each context may provide an independent communication space. Different packets may be transmitted in different contexts (specifically, different communication spaces), and a packet transmitted in one context is not transmitted to another context. A computing node in the collective communication system may initiate a control packet procedure by using the foregoing features of the context. Specifically, the computing node may generate the control packet based on the existing context of the collective communication system, for example, a context of an application or a context of a communicator, and send the control packet to another computing node in the collective communication system, and query, based on the control packet, a network topology and an in-network computing capability of the switch network that the control packet passes through, to perform an INC offloading operation on subsequent service packets.

In the method, the control packet such as a query packet, a notification packet or the like is directly sent and received by multiplexing the context of the collective communication system, and the in-network computing capability is queried based on the control packet. As a result, INC offloading is performed on the subsequent service packets based on the in-network computing capability, thereby avoiding repeated creation and obtaining of a related resource, and decoupling dependency on a control plane manager and a computing node daemon. Based on this, an in-network computing solution provided in this embodiment of this application is more maintainable, flexible, and universal.

Further, the method supports multiplexing of an existing network protocol channel, for example, an Ethernet channel, does not depend on a communication standard, does not need to use a remote direct memory access (RDMA) infiniband (IB), and does not need to additionally configure an IB switch. Therefore, costs of the in-network computing solution can be greatly reduced.

In addition, in the method, a daemon does not need to be run on the computing node, and only an INC dynamic library (INC lib) needs to be provided, and a specified API in the INC lib is invoked in a collective operation communicator to implement control packet service logic.

To make the technical solutions in this application clearer and easier to understand, the following describes the technical solutions in embodiments of this application with reference to a system architectural diagram.

Refer to an architectural diagram of a collective communication system shown in FIG. 1, the collective communication system 100 includes a switch network 102 and a plurality of computing nodes 104. The plurality of computing nodes 104 include one master node and at least one child node. The master node is a computing node on which a root process (a process whose process sequence number is 0 in an ordered process series) in the collective communication system is located, and the child node is a computing node other than the master node in the collective communication system. The child node may include a sub-root process.

The switch network 102 includes at least one layer of switches 1020. Specifically, the switch network 102 may be a single-layer switch architecture, for example, includes a layer of access layer switches. The access layer switch may be specifically a top of rack (ToR) switch, so that interconnection between the computing node such as a server and the switch 1020 in a cabinet can be implemented. It should be noted that the ToR switch may also be actually deployed in another position in the cabinet, for example, in the middle of the cabinet, as long as the server and the switch can be interconnected in the cabinet.

The switch network 102 may also be a multi-layer switch architecture. For example, as shown in FIG. 1, the switch network 102 may be a leaf-spine architecture. The switch network 102 of the leaf-spine architecture includes an upper-layer switch, namely, a spine switch, located at an tipper layer, and a lower-layer switch, namely, a leaf switch, located at a lower layer. The spine switch is no longer a large box switch in a three-layer architecture, but a high port density switch. The leaf switch can function as an access layer. The leaf switch provides network connections for a terminal and a server and connects to the spine switch at the same time. It should be noted that there may be one or more switches 1020 at each layer. This is not limited in this embodiment of this application.

The computing node 104 is a device having a data processing capability, and may be specifically a server, or a terminal device such as a personal computer, a notebook computer, or a smartphone. The plurality of computing nodes 104 may be homogeneous devices. For example, the plurality of computing nodes may be all servers of an Intel complex instruction set (X86) architecture, or all servers of an advanced reduced instruction set computing machine (advanced RISC machine, ARM) architecture. The plurality of computing nodes 104 may alternatively be heterogeneous devices. For example, some computing nodes 104 are servers of the X86 architecture, and some computing nodes are servers of the ARM architecture.

The switch network 102 and the plurality of computing nodes 104 form an HPC cluster. Any one or more computing nodes 104 in the cluster may be used as a storage node of the cluster. In some implementations, an independent node may also be added to the cluster as a storage node of the cluster.

Figure 2:
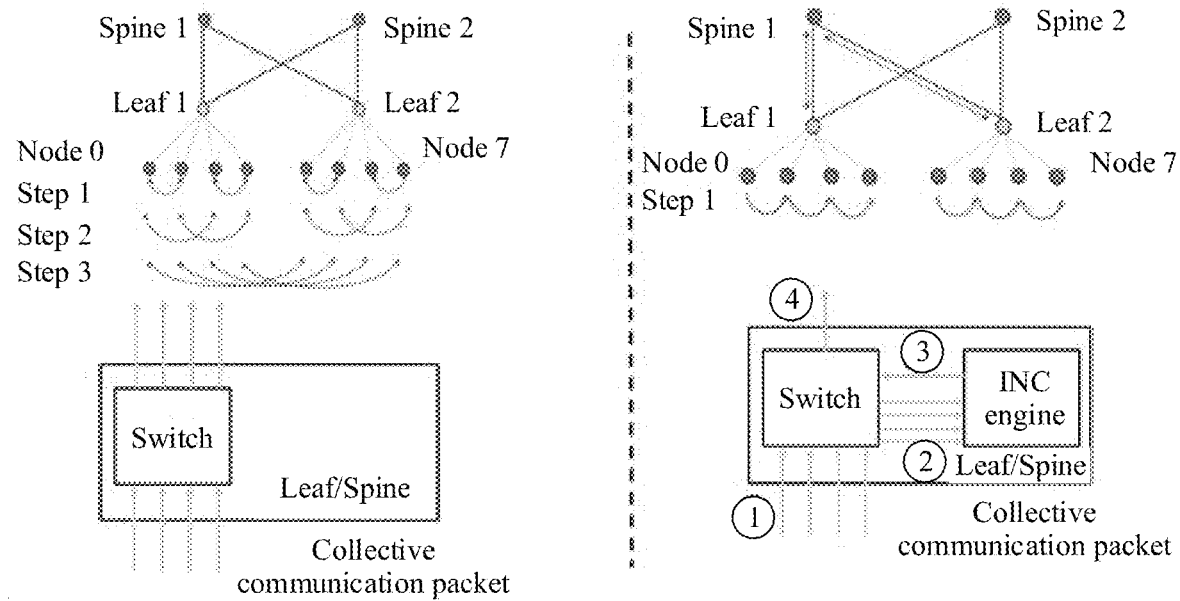
FIG. 2 is a principle diagram of in-network computing in a collective communication system according to an embodiment of this application.

The switch network 102 is connected to each computing node 104, which is used as an in-network computing node. When the root process of the master node triggers a collective operation, for example, a reduction summation operation, as shown in FIG. 2, and when the switch 1020, such as the leaf switch or the spine switch, in the switch network 102 receives collective communication packets, which are specifically service packets of the collective communication system, the service packets may be aggregated, computing is offloaded to an in-network computing engine of the switch, and the INC engine performs in-network computing on the aggregated service packets. Then, the switch 1020 forwards a computing result to the computing node 104, so that load of the computing node 104 can be reduced computing is jointly completed on the switch network 102 and the computing node 104. This reduces a quantity of sending and receiving times of the computing node 104, shortens communication time, and improves performance of collective communication.

It should be noted that the switch network 102 offloads computing to the INC engine of the switch, and the INC engine performs in-network computing on the aggregated packets. The computing node 104 needs to know in-network computing network information (including a network topology) and an in-network computing capability in advance, to request a corresponding resource based on the network information and the in-network computing capability. The network information and the in-network computing capability can be obtained through a control packet.

Specifically, an application that supports the collective communication may be deployed at the computing node 104 in the collective communication system in a distributed manner. When the application is initialized, a control packet procedure may be initiated at the computing node 104. Specifically, one computing node 104 in the collective communication system is used as a destination node, and at least one computing node 104 in the remaining computing nodes 104 is used as a source node. The source node generates a query packet based on a context of the collective communication system, and transmits the query packet to the destination node.

When the query packet passes through the switch 1020 in the switch network 102, the switch 1020 may add an in-network computing capability of the switch 1020 to the control packet, and then forward the query packet to the destination node. The destination node may generate a notification packet based on the query packet to which the in-network computing capability of the switch 1020 is added, and return the notification packet to the source node, to notify the in-network computing capability of the switch network 102 to the source node. In this way, the in-network computing capability can be obtained based on the control packet.

In some implementations, a network interface card in the computing node 104 also has a specific computing capability. Based on this, the computing node 104 may further offload computing to the network interface card, to implement intra-node offloading. Specifically, when the collective communication involves intra-node communication and inter-node communication, intra-node computing may be offloaded to the network interface card, and inter-node computing may be offloaded to the switch 1020. In this way, collective communication performance in a large-scale cluster can be further optimized.

Collective communication between 32 processes located at eight computing nodes 104 is used as an example. Each computing node 104 includes four processes. The four processes may be aggregated on the network interface card in the computing node 104. Computing of the four processes is offloaded to the network interface card. The network interface card forwards computing results of the four processes to the switch 1020. The switch 1020 further aggregates computing results of different computing nodes 104. Computing is offloaded to the switch 1020. In this way, an in-network computing solution based on the network interface card and the switch 1020 can be implemented.

The plurality of computing nodes in the collective communication system may be one master node and at least one child node. In some possible implementations, the source node may be the foregoing child node, and the destination node may be the foregoing master node, that is, the child node sends the query packet to the master node, to query the in-network computing capability of the switch network 102. In some other possible implementations, the source node may alternatively be the master node, and the destination node may also be the child node, that is, the master node sends the query packet to the child node, to query the in-network computing capability of the switch network 102.

The foregoing describes the architecture of the collective communication system. The following describes devices such as the switch 1020 and the computing node 104 in the collective communication system from a perspective of hardware materialization.

Figure 3:
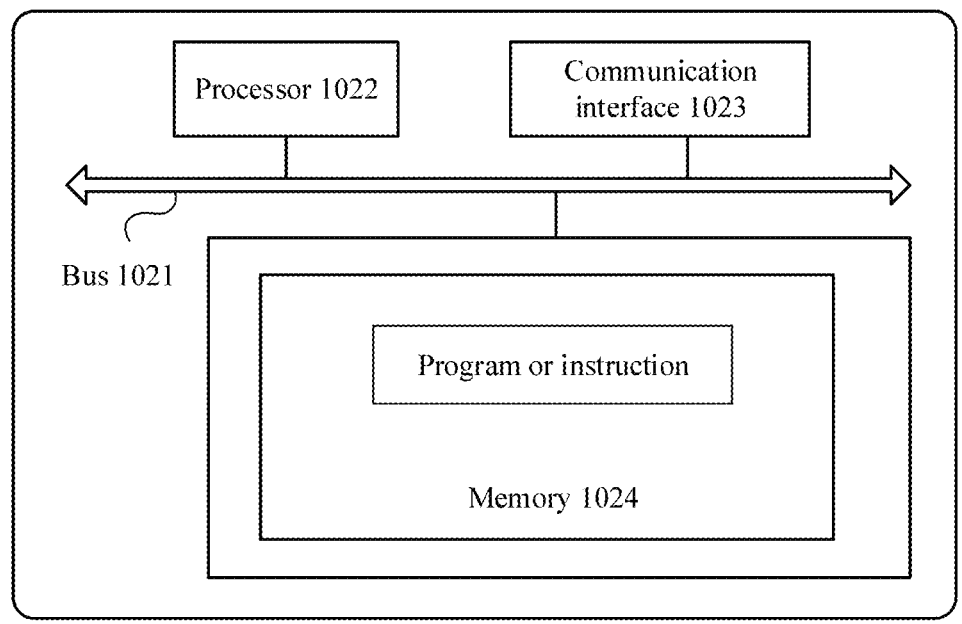
FIG. 3 is a schematic diagram of a structure of a switch in a collective communication system according to an embodiment of this application.

FIG. 3 is a schematic diagram of a structure of the switch 1020. It should be understood that FIG. 3 shows only some hardware structures and some software modules of the foregoing switch 1020. During specific implementation, the switch 1020 may further include more hardware structures, such as indicators, and more software modules, such as various applications.

As shown in FIG. 3, the switch 1020 includes a bus 1021, a processor 1022, a communication interface 1023, and a memory 1024. The processor 1022, the memory 1024, and the communication interface 1023 communicate with each other through the bus 1021.

The bus 1021 may be a peripheral component interconnect (PCI) bus, a peripheral component interconnect express (PCIe) bus, an extended industry standard architecture (EISA) bus, or the like. The bus may be classified into an address bus, a data bus, a control bus, and the like. For ease of representation, only one thick line is used to represent the bus in FIG. 3, but this does not indicate that there is only one bus or only one type of bus.

The processor 1022 may be any one or more of processors such as a central processing unit (CPU), a graphics processing unit (GPU), a microprocessor (MP), or a digital signal processor (DSP).

The communication interface 1023 is used to communicate with the outside, for example, receive a query packet sent by a child node, and send a notification packet generated by a master node to the child node.

The memory 1024 may include a volatile memory, for example, a random access memory (RAM). The memory 1024 may alternatively include a non-volatile memory, for example, a read-only memory (ROM), a flash memory, a hard disk drive (HDD), or a solid state drive (SSD).

The memory 1024 stores a program or instructions, for example, a program or instructions required for implementing the method for processing the control packet in the collective communication system provided in embodiments of this application. The processor 1022 executes the program or the instructions to perform the foregoing method for processing the control packet in the collective communication system.

It should be noted that FIG. 3 shows only one switch 1020 in the switch network 102. In some implementations, the switch network 102 may include a plurality of switches 1020. Considering transmission performance between the switches 1020, the plurality of switches 1020 may also be integrated on one backplane, or placed on a same rack.

Figure 4:
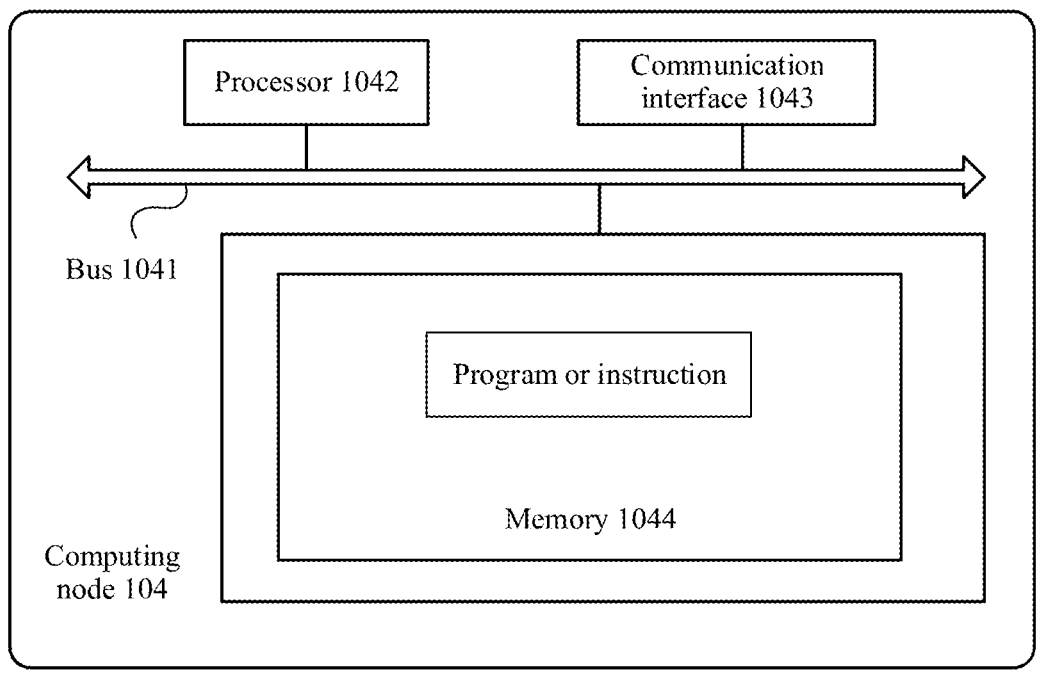
FIG. 4 is a schematic diagram of a structure of a computing node in a collective communication system according to an embodiment of this application.

FIG. 4 is a schematic diagram of a structure of the computing node 104. It should be understood that FIG. 4 shows only some hardware structures and some software modules of the foregoing computing node 104. During specific implementation, the computing node 104 may further include more hardware structures, such as a microphone and a speaker, and more software modules, such as various applications.

As shown in FIG. 4, the computing node 104 includes a bus 1041, a processor 1042, a communication interface 1043, and a memory 1044. The processor 1042, the memory 1044, and the communication interface 1043 communicate with each other through the bus 1041.

The bus 1041 may be a PCI bus, a PCIe bus, an EISA bus, or the like. The bus may be classified into an address bus, a data bus, a control bus, and the like. For ease of representation, only one thick line is used to represent the bus in FIG. 4, but this does not indicate that there is only one bus or only one type of bus. The processor 1042 may be any one or more of processors such as a CPU, a GPU, an MP, or a DSP. The communication interface 1043 is used to communicate with the outside, for example, transmit a query packet through the switch network 102, or transmit a notification packet through the switch network 102.

The memory 1044 may include a volatile memory, for example, a random access memory. The memory 1044 may alternatively include a non-volatile memory for example, a read-only memory, a flash memory, a hard disk drive, or a solid state drive. The memory 1044 stores a program or instructions, for example, a program or instructions required for implementing the method for processing the control packet in the collective communication system provided in embodiments of this application. The processor 1042 executes the program or the instructions to perform the foregoing method for processing the control packet in the collective communication system.

To make the technical solutions of this application clearer and easier to understand, the following describes in detail, with reference to the accompanying drawings, the method for processing the control packet in the collective communication system provided in embodiments of this application.

Figure 5:
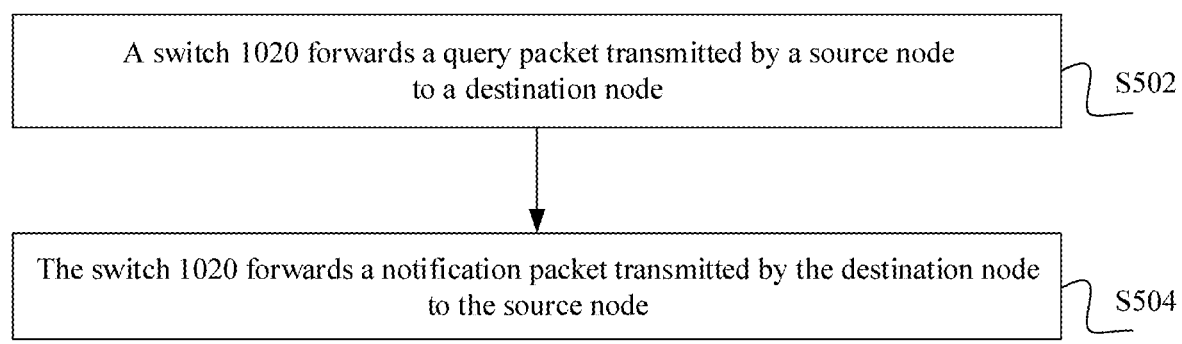
FIG. 5 is a flowchart of a method for processing a control packet in a collective communication system according to an embodiment of this application.

Refer to a method for processing a control packet in a collective communication system shown in FIG. 5. The method includes the following steps.

S502: The switch 1020 forwards a query packet transmitted by a source node to a destination node.

To simplify a service packet communication procedure in the collective communication system and optimize collective communication performance, the computing node 104 may first transmit the control packet, and obtain information such as an in-network computing capability based on control-plane control packet interaction, to lay a foundation for service packet transmission.

In some possible implementations, a child node in the computing node 104 may be used as a source node to initiate a control packet procedure. Specifically, the child node (which is specifically a sub-root process of the child node) may generate the query packet based on a context of the collective communication system, for example, a context of an application or a context of a communicator. The query packet is a type of control packet, and is used to query an in-network computing capability of the switch network 102. The in-network computing capability may also be referred to as an in-computing offloading capability, and is used to represent a capability that the switch network 102 can undertake a computing task. The in-network computing capability may be represented by using at least one of the following indicators: a supported collective operation type and a supported data type.

The collective operation type supported by the switch network 102 may include any one or more of broadcasting from one member to all members in a group, data gathering by one member from all members in a group, data scattering from one member to all members in a group, a data scattering/gathering operation from all members in a group to/by all members, a global reduction operation, a combined reduction and scattering operation, and a search operation on all members in a group. The member refers to a process in a process group.

The data type supported by the switch network 102 may include any one or more of a byte, a 16-bit integer (short), a 32-bit integer (int), a 64-bit integer (long), a floating point (float), a double-precision floating point (double), a. Boolean (Boolean), a character (char), and the like.

Transmission of the query packet from the child node to the master node is implemented through the switch network 102. Specifically, the query packet is generated based on the context of the collective communication system, for example, the context of the communicator. The query packet may carry a communicator identifier. For example, an INC packet header carries the communicator identifier. The switch 1020 forwards the query packet to the destination node in the communicator based on the communicator identifier. The child node may obtain the in-network computing capability of the switch network 102 based on a notification packet corresponding to the query packet without obtaining network information of the switch network 102 (specifically, topology information of the switch network 102) through an SM process on a management node, and notify the topology information to an AM. The AM obtains the in-network computing capability of the switch network 102.

In some implementations, a switch 1020 (which may also be referred to as a first switch) that receives the query packet in the switch network 102 may add an in-network computing capability of the switch 1020 to the query packet, and then forward, to the master node (specifically, a root process of the master node), the query packet to which the in-network computing capability of the switch 1020 is added.

Specifically, the query packet includes the INC packet header. The INC packet header is used to identify that the packet is an INC packet, including an INC control packet or an INC data packet (also referred to as an INC service packet). When receiving a packet, the switch 1020 may identify, based on whether the INC packet header is included, whether the packet is an INC packet, and further determine whether to perform an operation of querying the in-network computing capability.

To query the in-network computing capability, a query field may be reserved in the query packet. The switch 1020 adds the in-network computing capability of the switch 1020 to the query field. The in-network computing capability of the switch 1020 includes in-network computing features such as an operation type and a data type that are supported by the switch 1020, and these in-network computing features may form an in-network computing feature list (INC feature list). The switch 1020 may add the INC feature list to the query field.

Figure 6:
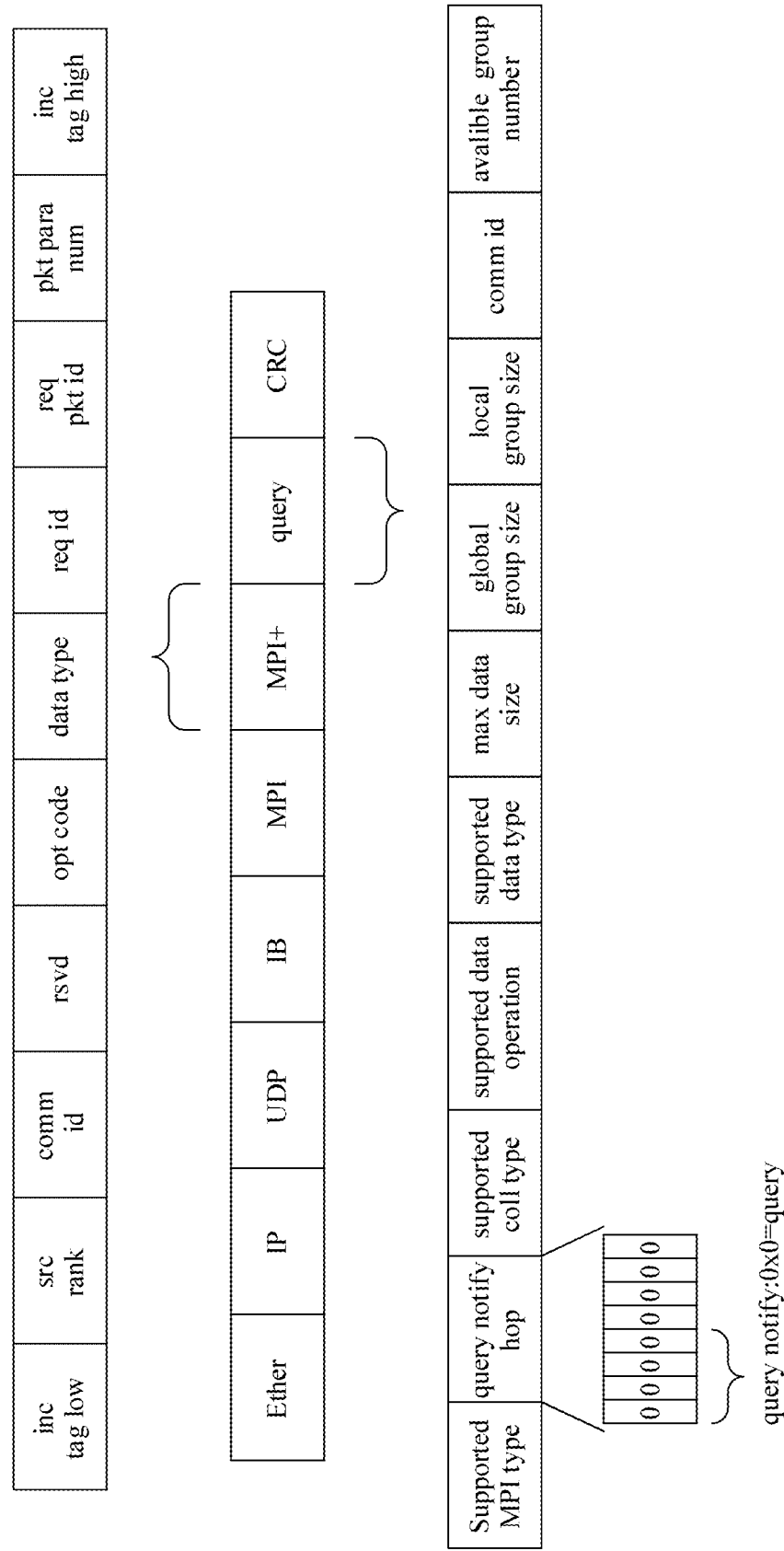
FIG. 6 is a schematic diagram of a structure of a query packet in a collective communication system according to an embodiment of this application.

For ease of understanding, an embodiment of this application further provides an example of the query packet. The query packet includes the INC packet header and a valid payload of the INC packet. As shown in FIG. 6, the INC packet header is an MPI field, and the valid payload of the INC packet is the query field. In some implementations, a header of the query packet further includes an MPI packet header, an IB packet header, a user datagram protocol (UDP) packet header, an Internet protocol (IP) packet header, an Ethernet (Ether) packet header, and the like for transmission at a transport layer and over an Ethernet. Certainly, a tail of the query packet may further include a check field, for example, a cyclic redundancy check (CRC) field.

The INC packet header may specifically include an in-network computing tag (INC Tag) and a communicator identifier (commID). The in-network computing tag includes an INC tag low. In some examples, when a value of the INC tag low is 0x44332211, the packet is identified as an INC packet. The in-network computing tag may further include an INC tag high, and the INC tag high and the INC tag low may be used together to identify that the packet is an INC packet, thereby improving accuracy of identifying the INC packet. The communicator identifier specifically identifies a communicator multiplexed in current collective communication. In some possible implementations, the INC packet header further includes an operation code (operation code, opt code) and a data type (data type) of the current collective communication.

The INC packet header may further include a source process sequence number (source rank, src rank), namely, a rank number of a process that generates the packet. The INC packet header may further include one or more of a request identifier (req ID), a request packet number (ReqPkt Num), and a packet parameter number (PktPara Num). In some embodiments, the INC packet header may further include a reserved field, for example, a reserved identifier (rsvd). Different reserved values of the reserved identifier may be used to distinguish a control packet sent by the computing node from a control packet sent by the switch.

The query field includes a supported operation type (supported data operation) and a supported data type (supported data type) by the switch. In some implementations, the query field may further include a supported MPI type (supported MPI type), a supported collection type (supported coll type), a maximum data size (max data size), a global group size (global group size), a local group size (local group size), a communicator identifier (comm ID), and an available group number. The query field may further include a query notify hop. The query notify hop may occupy one byte, and when values of the first four bits of the byte are 0x0, it indicates that the packet is a query packet.

The query packet passes through a switch 1020, and the switch 1020 fills an in-network computing capability of the switch in the query packet (which may be specifically a query field of the query packet). When the query packet passes through a plurality of switches 1020, each switch 1020 adds an in-network computing capability of the switch 1020 to the query packet, and specifically, adds the operation type and/or the data type that are/is supported by the switch 1020.

Further, the in-network computing capability of the switch 1020 may further include a size of a remaining available resource for in-network computing of the switch 1020. The size of the remaining available resource for in-network computing of the switch 1020 may be represented by using a maximum value of a quantity of concurrent hosts of the switch 1020, which is also referred to as a local group size. Based on this, the switch 1020 may further add the local group size to the query packet. In some embodiments, the switch 1020 may further add any one or more of the supported MPI type, the supported collection type, the maximum data size, the global group size, the communicator identifier, and the like.

The master node (specifically, the root process of the master node) may summarize in-network computing capabilities of these switches 1020 to obtain the in-network computing capability of the switch network 102, and generate the notification packet based on the in-network computing capability of the switch network 102. The notification packet is used to notify the in-network computing capability of the switch network 102 to the sub-root process of the child node.

In some implementations, the switch 1020 may further fill a packet hop count (hop) in the query field. Referring to FIG. 6, the switch 1020 may add the packet hop count to the last four bits of the query notify hop. Correspondingly, the switch 1020 may further establish an entry based on the packet hop count.

Specifically, when the packet hop count is 0, it indicates that the source node is directly connected to the switch 1020, and the switch 1020 establishes the entry in the switch. In this way, in a service packet procedure, the switch 1020 receives service packets, and may perform computing offloading on the service packets based on the foregoing entry.

In some embodiments, the entry includes at least an identifier of the source node (specifically, a process on the source node), for example, a source rank. The switch 1020 first identifies, based on packet headers, that the service packets are INC packets, and then compares src ranks in the packets with a src rank in the entry. When src ranks are consistent, the switch 1020 allocates INC resources and performs computing offloading. Further, when collective communication is completed, the switch 1020 may delete the foregoing entry to release the INC resource. In this way, the INC resource is allocated and released in real time, and resource utilization is optimized.

S504: The switch 1020 forwards the notification packet transmitted by the destination node to the source node.

The notification packet is used to notify the in-network computing capability of the switch network 102 to the source node. The notification packet is generated by the destination node based on the query packet. Similar to the query packet, the notification packet carries the context of the collective communication system, for example, the communicator identifier. In addition, the notification packet further carries the in-network computing capability of the switch network 102. The context enables the notification packet to be accurately transmitted to a corresponding node (specifically, a process of the node, for example, a sub-root process of a child node). In this way, the source node such as a child node can obtain the in-network computing capability of the switch network 102 without starting an SM process and an AM process on the management node.

Figure 7:
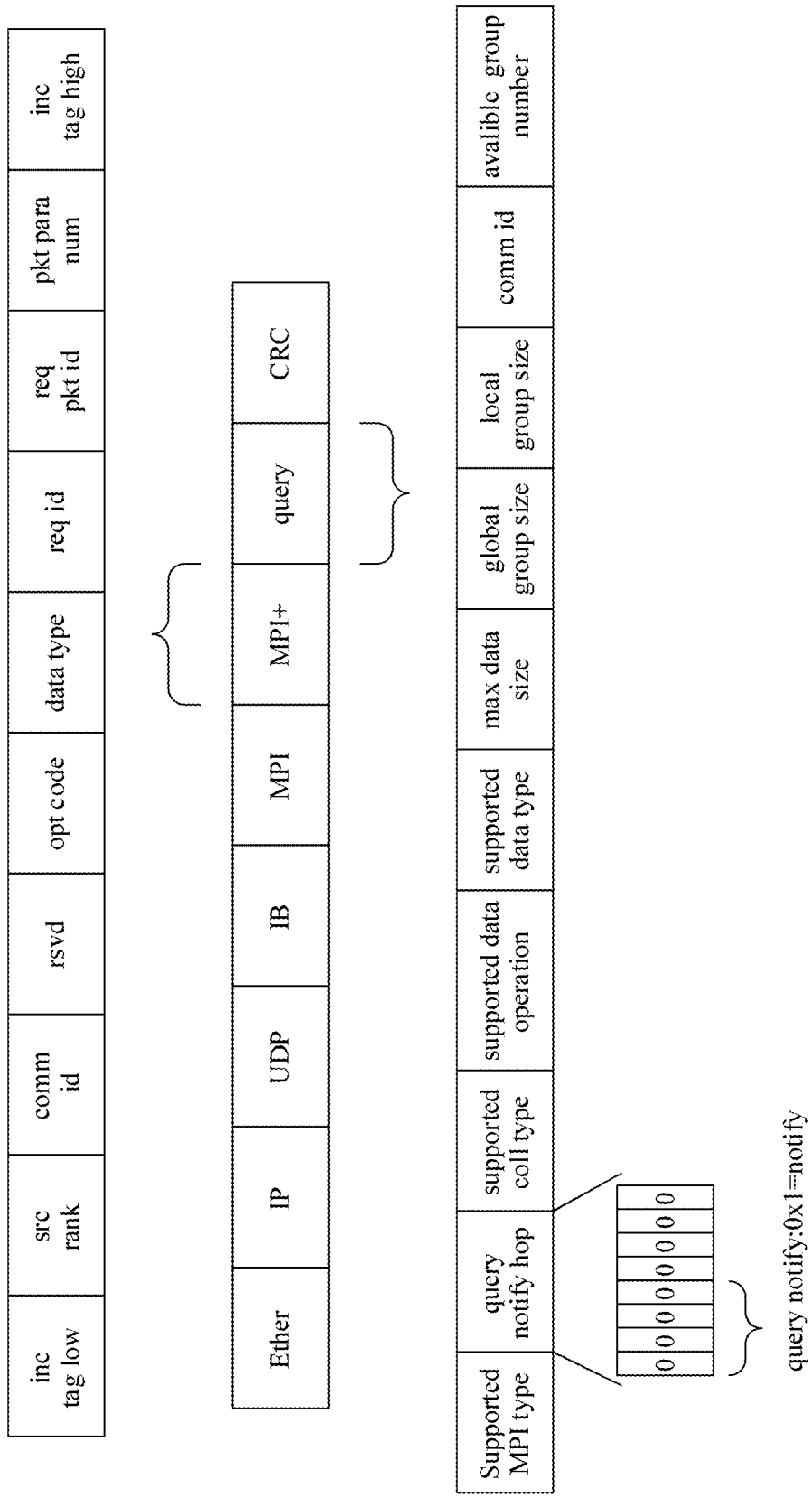
FIG. 7 is a schematic diagram of a structure of a notification packet in a collective communication system according to an embodiment of this application.

For ease of understanding, FIG. 7 further provides a specific example of the notification packet. As shown in FIG. 7, a format of the notification packet is the same as a format of the query packet, and a query field of the notification packet is filled with the in-network computing capability of the switch network 102, including the supported data operation, the supported data type, and the like. The query field may further include a query notify hop. The query notify hop may occupy one byte, and when values of the first four bits of the byte are 0x1, it indicates that the packet is a notification packet.

When the switch network 102 includes a single-layer switch 1020, which is specifically an access layer switch, the single-layer switch may forward the notification packet to the child node when receiving the notification packet, to transmit the notification packet generated by the master node to the child node.

When the switch network 102 includes a multi-layer switch 1020, which is specifically upper-layer switches and a lower-layer switch, the lower-layer switch may determine a target switch from the upper-layer switches based on sizes of remaining available resources for in-network computing. The target switch is specifically configured to aggregate service packets in a subsequent service packet procedure, so as to implement in-network computing. In this way, the lower-layer switch may add a size of a remaining available resource for in-network computing of the target switch to the notification packet. The size of the remaining available resource for in-network computing of the target switch may be represented by a maximum value of a quantity of concurrent hosts of the target switch, namely, an available group number. Based on this, the lower-layer switch may add the available group number to the query field of the notification packet.

The in-network computing capability of the switch network 102 may further include the available group number, namely, the size of the remaining available resource for in-network computing of the target switch. The lower-layer switch may forward, to the child node, the notification packet to which the size of the remaining available resource for in-network computing of the target switch is added. Correspondingly, the child node may initiate a service packet procedure based on the in-network computing capability of the switch network 102 in the notification packet, to implement in-network computing.

When determining the target switch, the lower-layer switch specifically determines the target switch from the upper-layer switches by using a load balancing policy based on the sizes of the remaining available resources for in-network computing. For example, the switch network 102 includes n switches, where m switches are upper-layer switches, and n is greater than n. When returning the notification packet to the child node, the master node forwards the notification packet through the switch network 102. When the notification packet arrives at a lower-layer switch close to the child node, the lower-layer switch selects a switch with a large available resource for in-network computing and a small load from the m upper-layer switches as the target switch based on a size of a remaining available resource for in-network computing of the upper-layer switch by using the load balancing policy.

In some implementations, the lower-layer switch may send a switch query packet to the upper-layer switch, where the switch query packet is used to query the size of the remaining available resource for in-network computing. Then, the upper-layer switch may return a switch notification packet to the lower-layer switch, where the switch notification packet carries the size of the remaining available resource for in-network computing.

After the lower-layer switch determines the target switch, the lower-layer switch may further send a resource request packet to the target switch, where the resource request packet is used to request to allocate a resource. A size of the resource requested to be allocated does not exceed the size of the remaining available resource of the target switch. The target switch performs resource allocation based on the resource request packet. After the allocation succeeds, the target switch may establish an entry, so that in the subsequent service packet procedure, subsequent service packets are aggregated by using the allocated resource and the corresponding entry, thereby implementing computing offloading. The target switch may further generate a resource response packet, and send the resource response packet to the lower-layer switch, where the resource response packet is used to notify the lower-layer switch that the resource allocation succeeds.

It should be noted that, in the embodiment shown in FIG. 5, an example in which the child node generates the query packet and sends the query packet to the master node, and the master node generates the notification packet based on the query packet to which the in-network computing capability of the switch 1020 is added and returns the notification packet to the child node is used for description. In another possible implementation of this embodiment of this application, alternatively, the master node may generate the query packet, and the child node may generate the notification packet, or one child node may generate the query packet, and another child node may generate the notification packet. This is not limited in embodiments of this application.

In the embodiment shown in FIG. 5, when the switch 1020 is directly connected to the source node and the destination node, the switch 1020 may directly receive the query packet sent by the source node and forward the query packet to the destination node, and then receive the notification packet sent by the destination node and forward the notification packet to the source node. In this way, the query packet and the notification packet can be sent and received through one-time forwarding. This improves efficiency of obtaining the in-network computing capability.

When the switch 1020 (which may also be referred to as the first switch) is connected to the source node by using another switch (referred to as the second switch in this application for ease of description), or is connected to the destination node by using another switch (referred to as a third switch in this application for ease of description), the switch 1020 may further forward the packet to the another switch, and forward the packet to the source node or the destination node by using the another switch.

Specifically, when the switch network 102 includes the second switch but does not include the third switch, the switch 1020 receives the query packet forwarded by the second switch, and forwards the query packet to the destination node. Then, the switch 1020 receives the notification packet sent by the destination node, and forwards the notification packet to the second switch.

When the switch network 102 includes the third switch but does not include the second switch, the switch 1020 receives the query packet sent by the source node, and forwards the query packet to the third switch. Then, the switch 1020 receives the notification packet forwarded by the third switch, and forwards the notification packet to the source node.

When the switch network 102 includes both the second switch and the third switch, the switch 1020 receives the query packet forwarded by the second switch, and forwards the query packet to the third switch. Then, the switch 1020 receives the notification packet forwarded by the third switch, and forwards the notification packet to the second switch.

The upper-layer switch and the lower-layer switch may include switches of more than one layer, that is, the multi-layer switch may be switches of two or more layers. For ease of description, in this embodiment of this application, the multi-layer switch included in the switch network 102 is further used as a leaf-spine architecture switch to describe the method for processing the control packet in the collective communication system by using an example.

Figure 8A:
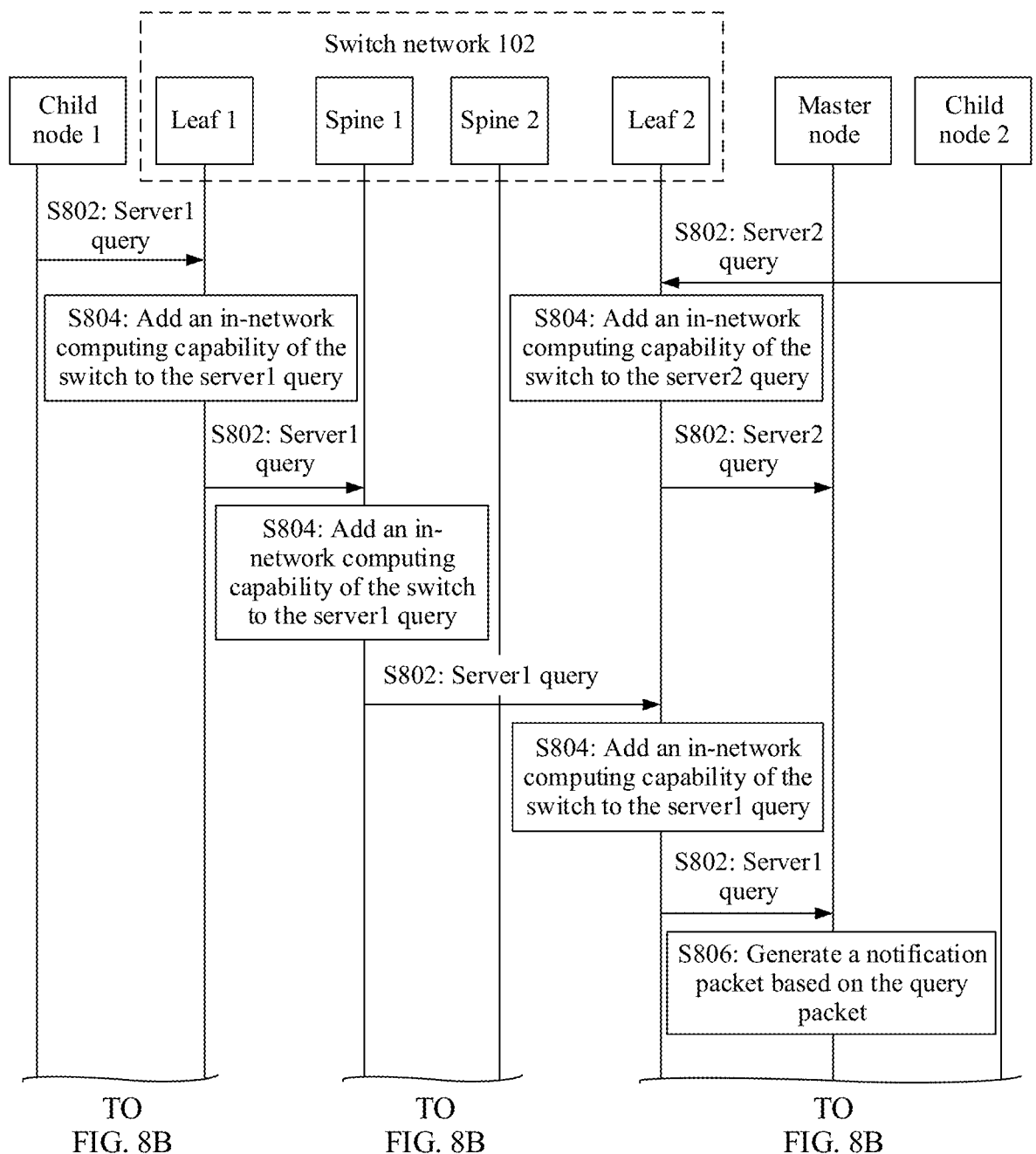
FIG. 8A and FIG. 8B are an interaction flowchart of a method for processing a control packet in a collective communication system according to an embodiment of this application.
Figure 8B:
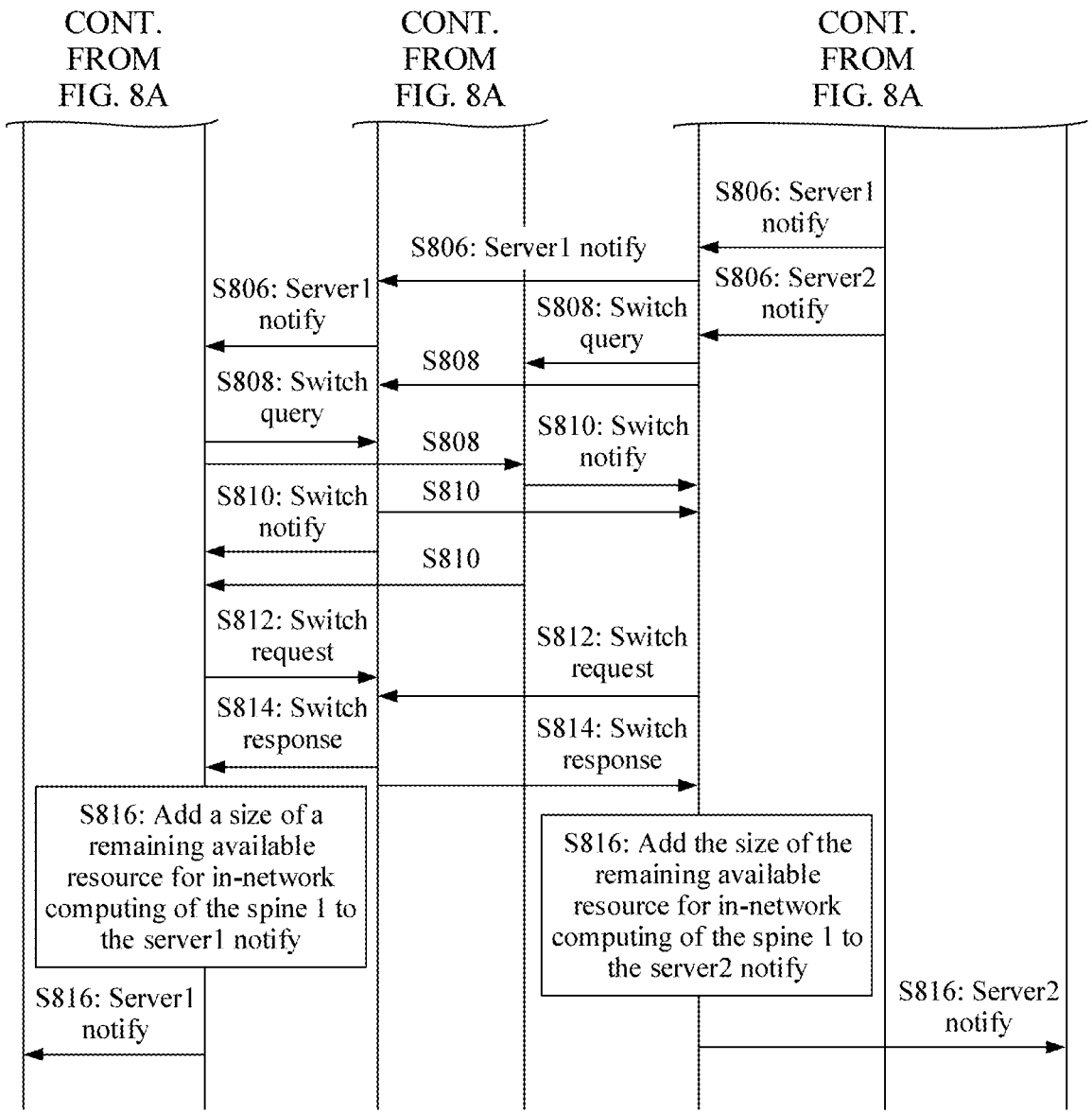

Refer to a flowchart of the method for processing the control packet in the collective communication system shown in FIG. 8A and FIG. 8B. In this example, the collective communication system includes one master node, at least one child node (for example, a child node 1 and a child node 2), and the switch network 102. The switch network 102 includes a leaf switch and a spine switch, and in this example, two leaf switches (which are specifically a leaf 1 and a leaf 2) and two spine switches (which are specifically a spine 1 and a spine 2) are included for description. The method includes the following steps.

S802: The child node generates a query packet based on a context of a communicator in the collective communication system, and sends the query packet to the master node.

Specifically, a sub-root process on the child node sends the query packet to a root process on the master node, to query an in-network computing capability of the switch network 102. The query packet is generated by the child node based on the context of the communicator, to ensure that the query packet can be correctly transmitted to the master node. The child node may be a server. For ease of distinguishing from another query packet, the query packet sent by the child node may be referred to as a server query.

The collective communication system includes a plurality of child nodes. For example, when the collective communication system includes a child node 1 and a child node 2, a query packet sent by the child node 1 is specifically a server1 query, and a query packet sent by the child node 2 is specifically a server2 query.

The communicator exists in the collective communication system, for example, a communicator corresponding to a process group formed by a root process, a sub-root process 1, and a sub-root process 2. The child node (specifically, a sub-root process on the child node, for example, the sub-root process 1 and the sub-root process 2) multiplexes the context of the communicator, sends the server query to the master node (specifically, the root process on the master node), without deploying a management node or starting a manager such as SM or AM on the management node.

In the example in FIG. 8A and FIG. 8B, because a server 1 and a server 2 are respectively directly connected to different switches, for example, the server 1 is directly connected to the leaf 1, the server 2 is directly connected to the leaf 2, the leaf 2 is also directly connected to the master node, and the leaf 1 is not directly connected to the master node, the server1 query needs to pass through the leaf 1, the spine 1, and the leaf 2 to reach the master node, and the server2 query needs to pass through the leaf 2 to reach the master node, paths of which are different.

S804: When receiving the query packet, the switch 1020 in the switch network 102 adds an in-network computing capability of the switch 1020 to the query packet.

A query field is reserved in the server query (such as a server query1 and a server query2). When the server query is transmitted to the master node through the switch, the switch 1020 adds the in-network computing capability of the switch 1020 to the query field of the server query. When the server query passes through a plurality of switches 1020, in-network computing capabilities of the plurality of switches 1020 are added to the query field.

The in-network computing capability of the switch 1020 specifically includes any one or more of a supported collective operation type, a supported data type, and the like. Further, the in-network computing capability of the switch 1020 further includes a size of a remaining available resource for in-network computing of the switch 1020.

In some implementations, the query field is further used to add a packet hop count (hop). The switch 1020 may further establish an entry based on a communicator identifier and the packet hop count. Specifically, when the packet hop count is 0, it indicates that the switch 1020 is directly connected to the child node, and the switch 1020 may establish the entry. In a subsequent service packet procedure, the switch 1020 aggregates service packets based on the entry, to further implement computing offloading.

S806: The master node generates a notification packet, and sends the notification packet to the child node.

Specifically, the master node may summarize a field value of the query field in the received server query (specifically, the server query to which the in-network computing capability of the switch 1020 is added), so as to obtain the in-network computing capability of the switch network 102. In addition, the master node may further obtain network information, such as topology information, of the switch network 102 based on a switch forwarding path.

The master node may generate the notification packet based on information such as the in-network computing capability, and return the notification packet to the corresponding child node. For ease of differentiation, the notification packet may be referred to as a server notify. When a plurality of child nodes send a server query, the master node can return a corresponding notification packet, for example, a server1 notify and a server2 notify. In the example in FIG. 8A and FIG. 8B, the server 1 and the server 2 are respectively connected to different switches. Therefore, paths of the server1 notify and the server2 notify are different.

S808: When receiving the notification packet, a lower-layer switch (an access layer switch) close to the child node sends a switch query packet to an upper-layer switch.

A lower-layer switch close to the child node 1 is a leaf 1, and a lower-layer switch close to the child node 2 is a leaf 2. When the leaf 1 receives the server1 notify, the leaf 1 sends a switch query packet, the switch query, to an upper-layer switch (which is specifically a spine 1 and a spine 2).

When the leaf 2 receives the server2 notify, the leaf 2 sends the switch query to the spine 1 and the spine 2. The switch query is used to query the size of the remaining available resource for in-network computing.

S810: The upper-layer switch returns a switch notification packet to the lower-layer switch.

For ease of description, the switch notification packet may be referred to as a switch notify. The switch notify is used to notify a size of a remaining available resource for in-network computing of the upper-layer switch to the lower-layer switch.

S812: The lower-layer switch determines a target switch based on the size of the remaining available resource for in-network computing, and sends a resource request packet to the target switch.

Specifically, the lower-layer switch such as the leaf 1 or the leaf 2 summarizes resource information fed back by each upper-layer switch through the switch notify, and determines the target switch based on a size of a remaining available resource for in-network computing of each upper-layer switch. When determining the target switch, the lower-layer switch may determine the target switch by using a load balancing policy. In this way, load of each switch can be balanced, and a quantity of concurrent collective communication can be increased.

In some implementations, the lower-layer switch may alternatively randomly select, as the target switch, a switch from switches whose sizes of remaining available resources are greater than or equal to a size of a requested resource. An implementation of determining the ta get switch is not limited in this embodiment of this application.

After determining the target switch, the lower-layer switch may send the resource request packet to the target switch, to request to allocate a resource. In the embodiment shown in FIG. 8A and FIG. 8B the target switch is the spine 1, and the leaf 1 and the leaf 2 separately send the resource request packet to the spine 1. The resource request packet is a request packet sent by the lower-layer switch to the target switch, and may be denoted as a switch request for differentiation.

S814: The target switch sends a resource response packet to the lower-layer switch.

Specifically, the target switch such as the spine 1 may collect statistics on whether all switch requests in the communicator of the current collective communication are received. After all switch requests are received, a resource may be allocated, and then the resource response packet is returned to the lower-layer switch. Similar to the switch request, the resource response packet may be denoted as a switch response.

The switch request includes a global group size field and a local group size field. A global group size is also referred to as a global host number, and a local group size is also referred to as a local host number. The target switch, for example, the spine 1, may determine, based on a field value of a local host number field and a field value of a global host number field, whether all switch requests are received. Specifically, the target switch may summarize switch requests, sum up local host numbers, and then compare the sum of the local host numbers with a global host number. If the sum of the local host numbers is equal to the global host number, it indicates that the switch requests are received totally; otherwise, whether all request messages are received is determined based on the local host numbers and the global host number in the INC packet.

Further, when receiving the switch request from the lower-layer switch, the target switch may further establish the entry, where the entry is used to allocate resources to subsequent service packets and aggregate the service packets, so as to implement computing offloading.

In some embodiments, when the method for processing the control packet in the collective communication system in this embodiment of this application is performed, steps in S812 in which the lower-layer switch sends the resource request packet to the target switch and S814 in which the target switch sends the resource response packet to the lower-layer switch may not be performed. After determining the target switch, the lower-layer switch may directly perform S816, and a process of requesting to allocate a resource may be performed in the subsequent service packet procedure.

S816: The lower-layer switch adds the size of the remaining available resource for in-network computing of the target switch to the notification packet, and forwards, to the child node, the notification packet to which the size of the remaining available resource for in-network computing of the target switch is added.

The notification packet is the server notify. The switch network 102 includes an upper-layer switch, for example, the spine 1 and the spine 2. Service packets of the leaf 1 and the leaf 2 may be aggregated on the spine 1 or the spine 2. When the lower-layer switch determines that the spine 1 is the target switch, and successfully requests the target switch to allocate the resource the lower-layer switch may further add, to the server notify, the size of the remaining available resource for in-network computing of the target switch, the spine 1, that is, add an available group number to the query field. Then, the lower-layer switch sends, to the child node, the server notify to which the available group number is added. The server notify is used to notify the in-network computing capability of the switch network 102 to the child node, for example, the collective operation type and the data type that are supported by the switch 1020, and the size of the remaining available resource for in-network computing of the target switch, to lay a foundation for in-network computing of subsequent service packets. The leaf 1 sends the server1 notify to the child node 1, and the leaf 2 sends the server2 notify to the child node 2.

When the switch network includes only one spine, because service packets reported by the leaf may be directly aggregated based on the spine, a selection operation does not need to be performed. Therefore, in a control packet procedure, when receiving the notification packet, a lower-layer switch directly connected to the source node may not perform S808 to S816, but directly establish the entry on the spine, and forward the notification packet to the source node.

The embodiment shown in FIG. 8A and FIG. 8B is mainly described by using an example in which the switch network 102 includes a leaf switch and a spine switch. In some implementations, the switch network 102 includes a single-layer switch, the single-layer switch is an access layer switch, and the single-layer switch may include one or more switches, for example, one or more Tors. The following describes an example in which the switch network 102 includes a Tor 1 and a Tor 2.

Figure 9:
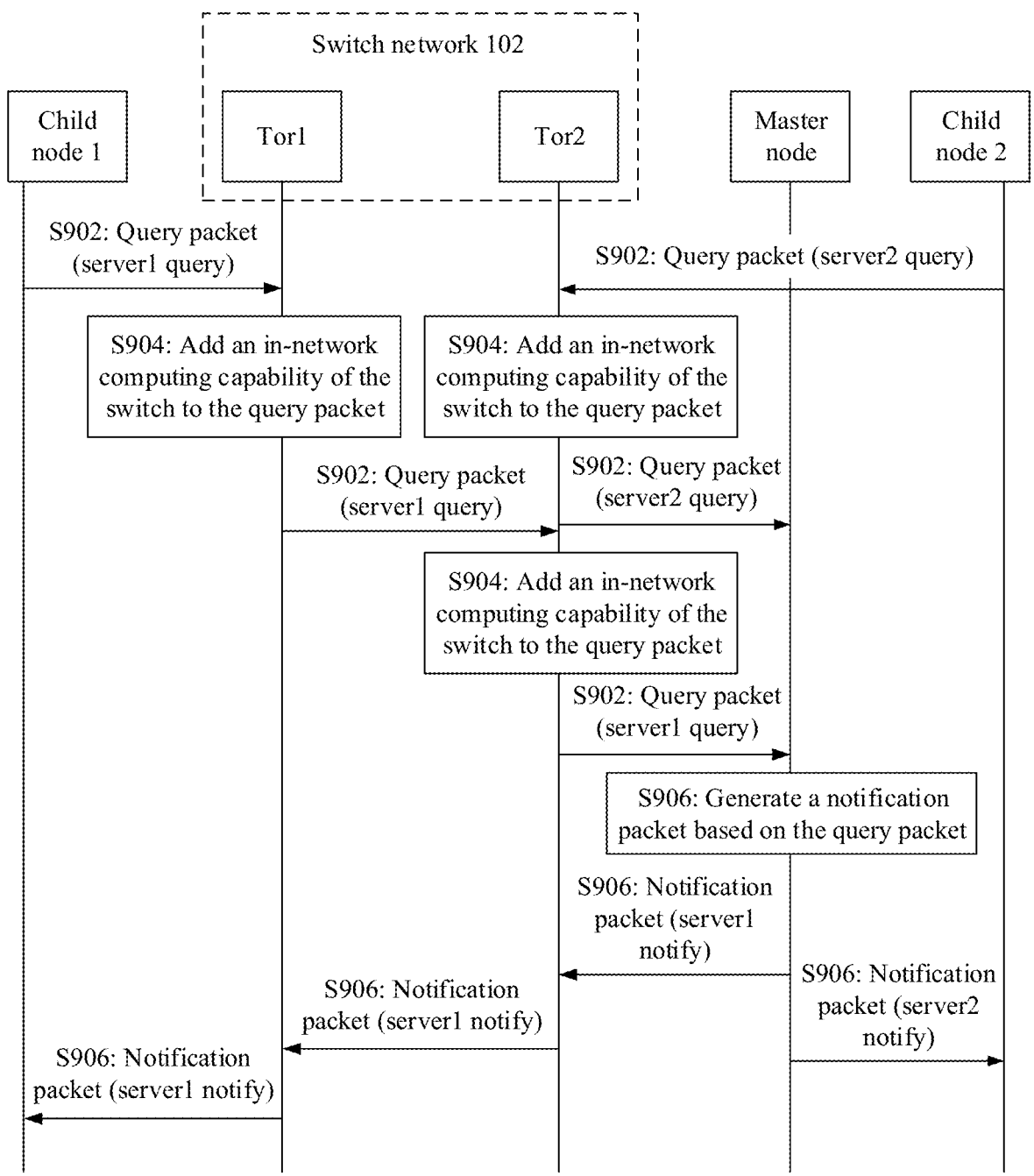
FIG. 9 is an interaction flowchart of a method for processing a control packet in a collective communication system according to an embodiment of this application.

Refer to a flowchart of the method for processing the control packet in the collective communication system shown in FIG. 9. The method includes the following steps.

S902: A child node generates a query packet based on a context of a communicator in the collective communication system, and sends the query packet to a master node.

S904: When receiving the query packet, the switch 1020 in the switch network 102 adds an in-network computing capability of the switch 1020 to the query packet.

For specific implementations of S902 to S904, refer to related content descriptions of S602 to S604. Details are not described in this embodiment of this application again.

S906: The master node generates a notification packet based on the query packet to which the in-network computing capability of the switch 1020 is added, and sends the notification packet to the child node.

The master node sends the notification packet to the child node through the switch network 102. The master node does not need to send a switch query packet to an upper-layer switch by using a switch in the switch network 102, so as to determine a size of an in-network computing available remaining resource of the upper-layer switch, and send a resource request packet to the upper-layer switch, so as to aggregate service packets at the upper-layer switch. Instead, the service packets are aggregated on Tor1 and Tor2 to implement in-network computing.

In the embodiment shown in FIG. 6 and FIG. 7, the computing node 104 may initiate a control packet procedure in a polling manner. In this way, the computing node 104 may obtain an in-network computing capability of the switch network 102 in real time when a topology of the switch network 102 changes. In some implementations, the computing node 104 may also periodically initiate the control packet procedure, to update the in-network computing capability of the switch network 102 in time when the topology of the switch network 102 changes.

FIG. 8A and FIG. 8B and FIG. 9 separately describe, from a perspective that the switch network 102 includes a multi-layer switch and a perspective that the switch network 102 includes a single-layer switch, the method for processing the control packet in the collective communication system according to embodiments of this application by using examples.

The following describes, with reference to a specific scenario such as a weather prediction scenario, the method for processing the control packet in the collective communication system provided in embodiments of this application.

In the weather prediction scenario, fine-scale weather simulation and forecast can be implemented by setting up an HPC cluster and deploying a weather research and forecasting model (weather research and forecasting model, WRF) on the HPC cluster.

Specifically, the HPC cluster may include one switch 1020 and eight computing nodes 104. The switch 1020 may be a 10-gigabit (G) Ethernet switch. The switch 1020 includes a processor, for example, one or more of a central processing unit (CPU) or a neural network processing unit (NPU). The switch 1020 implements in-network computing by using the foregoing CPU and NPL, thereby reducing computing pressure of the computing node 104. The computing node 104 may be a server configured with a 100 Ethernet card.

A user (for example, operation and maintenance personnel) deploys the community enterprise operating system (community enterprise operating system, cent OS) on the server, and then, deploys the WRF on the operating system. Before deploying the WRF, an environment variable configuration file needs to be created and a WRF dependency package needs to be installed, such as a hierarchical data format version 5 (hierarchical data format version 5, HDF5), parallel network common data format (parallel network common data form, PnetCDF), and dependency packages corresponding to different languages in netCDF, such as netCDF-C and netCDF-fortran. Then, the operation and maintenance personnel install a main program that is, install a WRF source code package. Before the source code package is installed, it may be first determined whether an environment variable is valid, to ensure that the WRF can run normally.

Among eight servers, one server functions as the master node, and the other servers function as child nodes. A process (which may be specifically a process of the WRF) on a child node generates a query packet based on a context of a communicator in the collective communication system and then sends the query packet to a process on the master node. When the query packet passes through the switch 1020, the switch 1020 adds an in-network computing capability of the switch 1020 to a query field of the query packet, and then forwards, to the master node, the query packet to which the in-network computing capability is added. In this way, the process on the master node receives the query packet to which the in-network computing capability of the switch 1020 is added, and obtains an in-network computing capability of the switch network 102 based on the query field of the query packet, which is specifically the in-network computing capability of the switch network 102 involved in this collective communication. The switch network 102 in this embodiment includes one switch 1020. Therefore, the in-network computing capability of the switch network 102 is the in-network computing capability of the switch 1020.

The process on the master node generates a notification packet based on the in-network computing capability, where the notification packet is used to notify the in-network computing capability of the switch network 102. Then, when receiving the notification packet, the switch 1020 forwards the notification packet to the process on the child node.

In this way, the process on the child node may know the in-network computing capability of the switch network 102. When the process on the child node performs collective communication, for example, performs a broadcast operation from one member to all members in a group, the child node may further offload computing to the switch 1020 based on the in-network computing capability. In this way, an in-network computing scheme of WRF is realized, and efficiency of weather forecast is improved.

It should be noted that the switch 1020 can support INC in terms of hardware, and support processing of the query packet in terms of software, which is specifically to add the in-network computing capability of the switch 1020 to the query packet. The switch 1020 may be a self-developed switch that has the foregoing functions, or may be obtained by reconstructing an existing switch based on the foregoing method provided in embodiments of this application. The computing node 104 may be a self-developed server, or may be a general-purpose server, and a corresponding MPI is deployed on the server.

The foregoing method provided in embodiments of this application may be further applied to a cloud environment. Specifically, the computing node 104 may be a cloud computing device in a cloud platform. For example, the computing node 104 may be a cloud server in an infrastructure as a service (IaaS) platform. The switch 1020 in the switch network 102 may be a switch in the cloud platform, namely, a cloud switch. The cloud computing device multiplexes the context of the communicator to transfer the control packet, so as to obtain the in-network computing capability of the cloud switch, and offloads load to the cloud switch based on the in-network computing capability, so that collective communication performance can be optimized, and a more elastic and efficient on-demand allocated service can be provided.

The foregoing describes in detail the method for processing the control packet in the collective communication system provided in embodiments of this application with reference to FIG. 1 to FIG. 9. The following describes, with reference to the accompanying drawings, a control packet apparatus in a collective communication system and devices such as a switch, a first computing node, and a second computing node that are provided in embodiments of this application.

Figure 10:
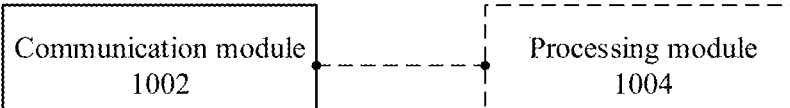
FIG. 10 is a schematic diagram of a structure of an apparatus for processing a control packet in a collective communication system according to an embodiment of this application.

Refer to a schematic diagram of a structure of an apparatus for processing a control packet in a collective communication system shown in FIG. 10. The collective communication system includes a switch network and a plurality of computing nodes, the switch network includes a first switch, and the apparatus 1000 includes:

a communication module 1002, configured to forward a query packet transmitted by a source node to a destination node, where the query packet is used to request to query an in-network computing capability of the switch network, the query packet is generated by the source node based on a context of the collective communication system, the source node and the destination node are different nodes in the plurality of computing nodes, and the communication module 1002 is further configured to forward a notification packet transmitted by the destination node to the source node, where the notification packet carries the in-network computing capability of the switch network.

In some possible implementations, the apparatus 1000 further includes:

a processing module 1004, configured to add an in-network computing capability of the first switch to the query packet when receiving the query packet; and the communication module 1002 is specifically configured to:

forward, to the destination node, the query packet to which the in-network computing capability of the first switch is added.

In some possible implementations, the in-network computing capability of the first switch includes a collective operation type and/or a data type that are/is supported by the first switch.

In some possible implementations, the in-network computing capability of the first switch includes a size of a remaining available resource for in-network computing of the first switch.

In some possible implementations, the apparatus further includes:

a processing module 1004, configured to establish an entry based on a hop count of the query packet, where the entry is used by the first switch to perform computing offloading on service packets.

In some possible implementations, the first switch is directly connected to the source node and the destination node; and the communication module 1002 is specifically configured to:

receive the query packet sent by the source node, and forward the query packet to the destination node; and
receive the notification packet sent by the destination node, and forward the notification packet to the source node.

In some possible implementations, the switch network further includes a second switch and/or a third switch, the second switch is configured to connect the first switch to the source node, and the third switch is configured to connect the first switch to the destination node; and the communication module 1002 is specifically configured to:
receive the query packet sent by the source node, and forward the query packet to the third switch; and
receive the notification packet forwarded by the third switch, and forward the notification packet to the source node; or
receive the query packet forwarded by the second switch, and forward the query packet to the destination node; and
receive the notification packet sent by the destination node, and forward the notification packet to the second switch; or
receive the query packet forwarded by the second switch, and forward the query packet to the third switch; and
receive the notification packet forwarded by the third switch, and forward the notification packet to the second switch.

In some possible implementations, the switch network includes a single-layer switch, and the first switch is the single-layer switch; and the communication module 1002 is specifically configured to:
forward the notification packet to the source node.

In some possible implementations, the switch network includes upper-layer switches and a lower-layer switch, and the first switch is the lower-layer switch;

the apparatus 1000 further includes:
a processing module 1004, configured to determine a target switch from the upper-layer switches based on sizes of remaining available resources for in-network computing of the upper-layer switches, and add a size of a remaining available resource for in-network computing of the target switch to the notification packet; and the communication module 1002 is specifically configured to:
forward, to the source node, the notification packet to which the size of the remaining available resource for in-network computing of the target switch is added.

In some possible implementations, the processing module 1004 is specifically configured to:
determine the target switch from the upper-layer switches by using a load balancing policy based on the sizes of the remaining available resources for in-network computing.

In some possible implementations, the communication module 1002 is further configured to:
send a switch query packet to the upper-layer switch, where the switch query packet is used to query the size of the remaining available resource for in-network computing of the upper-layer switch; and
receive a switch notification packet sent by the upper-layer switch, where the switch notification packet is used to notify the size of the remaining available resource for in-network computing of the upper-layer switch.

In some possible implementations, the switch network includes an upper-layer switch and a lower-layer switch, and the first switch is the upper-layer switch; and the communication module 1002 is further configured to:
receive a switch query packet sent by the lower-layer switch, where the switch query packet is used to query the size of the remaining available resource for in-network computing of the first switch; and send a switch notification packet to the lower-layer switch, where the switch notification packet is used to notify the size of the remaining available resource for in-network computing of the first switch to the lower-layer switch.

In some possible implementations, the context of the collective communication system includes a context of an application or a context of a communicator.

In some possible implementations, the plurality of computing nodes include a master node and at least one child node.

The source node is the child node, and the destination node is the master node.

Alternatively, the source node is the master node, and the destination node is the child node.

The apparatus 1000 for processing the control packet in the collective communication system according to this embodiment of this application may correspondingly perform the method described in embodiments of this application, and the foregoing and other operations and/or functions of the modules/units of the apparatus 1000 for processing the control packet in the collective communication system are separately used to implement corresponding procedures of the methods in embodiments shown in FIG. 5 to FIG. 9. For brevity, details are not described herein again.

The apparatus 1000 for processing the control packet in the collective communication system provided in the embodiment shown in FIG. 10 is specifically an apparatus corresponding to the switch 1020. An embodiment of this application further provides apparatuses respectively corresponding to the first computing node and the second computing node.

Figure 11:
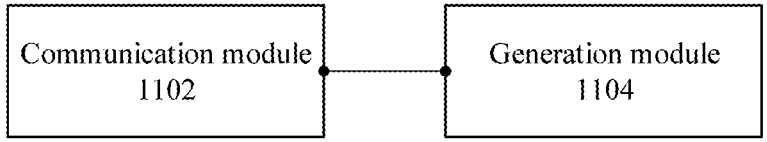
FIG. 11 is a schematic diagram of a structure of an apparatus for processing a control packet in a collective communication system according to an embodiment of this application.

Refer to a schematic diagram of a structure of an apparatus 1100 for processing a control packet in a collective communication system shown in FIG. 11. The collective communication system includes a switch network and a plurality of computing nodes, the switch network includes at least one switch, and the apparatus 1100 includes:
  a communication module 1102, configured to receive a query packet forwarded by one or more switches in the switch network, where the query packet is used to request to query an in-network computing capability of the switch network, and the query packet is generated by a second computing node based on a context of the collective communication system; and
  a generation module 1104, configured to generate a notification packet based on the query packet, where the notification packet carries the in-network computing capability of the switch network; and
  the communication module 1102 is further configured to send the notification packet to the second computing node.

In some possible implementations, the query packet forwarded by the switch includes an in-network computing capability of the switch that is added by the switch, and
  the generation module 1104 is specifically configured to:
  obtain the in-network computing capability of the switch network based on the in-network computing capability of the one or more switches in the query packet forwarded by the one or more switches; and
  generate the notification packet based on the in-network computing capability of the switch network.

In some possible implementations, the apparatus 1100 is deployed at the first computing node, and the first computing node is a master node or a child node.

The apparatus 1100 for processing the control packet in the collective communication system according to this embodiment of this application may correspondingly perform the method described in embodiments of this application, and the foregoing and other operations and/or functions of the modules/units of the apparatus 1100 for processing the control packet in the collective communication system are separately used to implement corresponding procedures of the methods in the embodiment shown in FIG. 8A and FIG. 8B or FIG. 9. For brevity, details are not described herein again.

Figure 12:
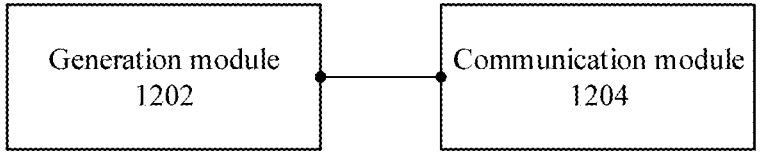
FIG. 12 is a schematic diagram of a structure of an apparatus for processing a control packet in a collective communication system according to an embodiment of this application.

Next, refer to a schematic diagram of a structure of an apparatus 1200 for processing a control packet in a collective communication system shown in FIG. 12. The collective communication system includes a switch network and a plurality of computing nodes, the switch network includes at least one switch, and the apparatus 1200 includes:
  a generation module 1202, configured to generate a query packet based on a context of the collective communication system, where the query packet is used to request to query an in-network computing capability of the switch network; and
  a communication module 1204, configured to send the query packet to a first computing node by using one or more switches in the switch network; and
  the communication module is further configured to receive a notification packet forwarded by the first computing node by using, the one or more switches, where the notification packet carries the in-network computing capability of the switch network, and the notification packet is generated by the first computing node based on the query packet.

In some possible implementations, the apparatus is deployed at the first computing node, and the first computing node is a master node or a child node.

The apparatus 1200 for processing the control packet in the collective communication system according to this embodiment of this application may correspondingly perform the method described in embodiments of this application, and the foregoing and other operations and/or functions of the modules/units of the apparatus 1200 for processing the control packet in the collective communication system are separately used to implement corresponding procedures of the methods in the embodiment shown in FIG. 8A and FIG. 8B or FIG. 9. For brevity, details are not described herein again.

Based on the apparatus 1000 for processing the control packet in the collective communication system, the apparatus 1100 for processing the control packet in the collective communication system, and the apparatus 1200 for processing the control packet in the collective communication system that are provided in embodiments shown in FIG. 10, FIG. 11, and FIG. 12, an embodiment of this application further provides a collective communication system 100.

For ease of description, in this embodiment of this application, the apparatus 1000 for processing the control packet in the collective communication system, the apparatus 1100 for processing the control packet in the collective communication system, and the apparatus 1200 for processing the control packet in the collective communication system are respectively referred to as a control packet processing apparatus 1000, a control packet processing apparatus 1100, and a control packet processing apparatus 1200 for short.

Figure 13:
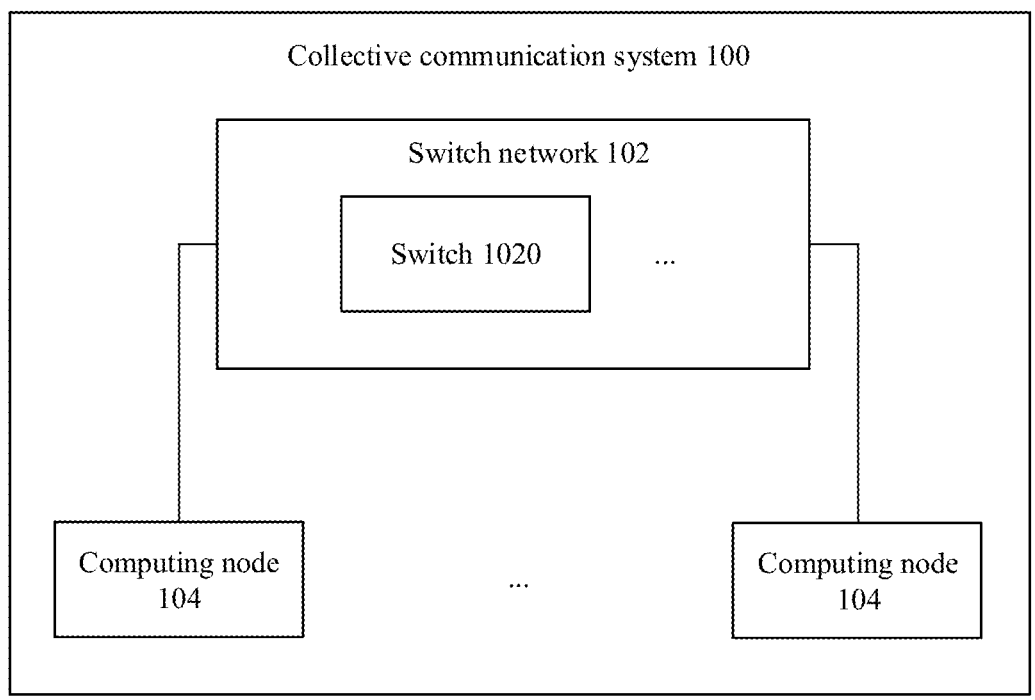
FIG. 13 is a schematic diagram of a structure of a collective communication system according to an embodiment of this application.

Refer to a schematic diagram of a structure of the collective communication system 100 shown in FIG. 13. The collective communication system 100 includes a switch network 102 and a plurality of computing nodes 104. The switch network 102 includes at least one switch 1020, and the switch 1020 is specifically configured to implement a function of the control packet processing apparatus 1000 shown in FIG. 10. The plurality of computing nodes 104 include one destination node and at least one source node. The destination node is specifically configured to implement a function of the control packet processing apparatus 1100 shown in FIG. 11. The source node is specifically configured to implement a function of the control packet processing apparatus 1200 shown in FIG. 12.

Specifically, the source node is configured to generate a query packet based on a context of the collective communication system 100, where the query packet is used to request to query an in-network computing capability of the switch network 102. The switch 1020 is configured to forward the query packet transmitted by the source node to the destination node. The destination node is configured to generate a notification packet based on the query packet, where the notification packet carries the in-network computing capability of the switch network. The switch 1020 is further configured to forward the notification packet transmitted by the destination node to the source node.

In some possible implementations, the switch 1020 is specifically configured to:
add an in-network computing capability of the switch 1020 to the query packet when receiving the query packet; and
forward, to the destination node, the query packet to which the in-network computing capability of the switch 1020 is added.

Correspondingly, the destination node is specifically configured to:
obtain the in-network computing capability of the switch network 102 based on the in-network computing capability of the switch 1020 in the query packet forwarded by the switch 1020; and
generate the notification packet based on the in-network computing capability of the switch network 102.

In some possible implementations, the in-network computing capability of the switch 1020 includes a collective operation type and/or a data type that are/is supported by the switch 1020.

In some possible implementations, the in-network computing capability of the switch 1020 also includes a size of a remaining available resource for in-network computing of the switch 1020.

In some possible implementations, the switch 1020 is further configured to:
establish an entry based on a hop count of the query packet, where the entry is used by the switch 1020 to perform computing offloading on service packets.

In some possible implementations, when the switch 1020 is directly connected to the source node and the destination node, the switch 1020 is specifically configured to:
receive the query packet sent by the source node, and forward the query packet to the destination node; and
receive the notification packet sent by the destination node, and forward the notification packet to the source node.

In some possible implementations, the switch network 102 further includes a second switch and/or a third switch, the second switch is configured to connect the switch 1020 to the source node, and the third switch is configured to connect the switch 1020 to the destination node; and
the switch 1020 is specifically configured to:
receive the query packet sent by the source node, and forward the query packet to the third switch; and
receive the notification packet forwarded by the third switch, and forward the notification packet to the source node: or
receive the query packet forwarded by the second switch, and forward the query packet to the destination node; and
receive the notification packet sent by the destination node, and forward the notification packet to the second switch; or
receive the query packet forwarded by the second switch, and forward the query packet to the third switch; and
receive the notification packet forwarded by the third switch, and forward the notification packet to the second switch.

In some possible implementations, the switch network 102 includes a single-layer switch, the switch 1020 is the single-layer switch, and the switch 1020 is specifically configured to:
forward the notification packet to the source node.

In some possible implementations, the switch network 102 includes upper-layer switches and a lower-layer switch, and the switch 1020 is the lower-layer switch; and
the switch 1020 is specifically configured to:
determine a target switch from the upper-layer switches based on sizes of remaining available resources for in-network computing of the upper-layer switches:
add a size of a remaining available resource for in-network computing of the target switch to the notification packet; and
forward, to the source node, the notification packet to which the size of the remaining available resource for in-network computing of the target switch is added.

In some possible implementations, the switch 1020 is further configured to:
determine the target switch from the upper-layer switches by using a load balancing policy based on the sizes of the remaining available resources for in-network computing of the upper-layer switches.

In some possible implementations, the switch 1020 is further configured to:
send a switch query packet to the upper-layer switch, where the switch query packet is used to query the size of the remaining available resource for in-network computing of the upper-layer switch; and
receive a switch notification packet sent by the upper-layer switch, where the switch notification packet is used to notify the size of the remaining available resource for in-network computing of the upper-layer switch to the switch 1020.

In some possible implementations, the switch network 102 includes an upper-layer switch and a lower-layer switch, and the switch 1020 is the upper-layer switch; and
the switch 1020 is further configured to:
receive a switch query packet sent by the lower-layer switch, where the switch query packet is used to query the size of the remaining available resource for in-network computing of the switch 1020; and
send a switch notification packet to the lower-layer switch, where the switch notification packet is used to notify the size of the remaining available resource for in-network computing of the switch 1020 to the lower-layer switch.

In some possible implementations, the context of the collective communication system includes a context of an application or a context of a communicator.

In some possible implementations, the plurality of computing nodes include a master node and at least one child node.

The source node is the child node, and the destination node is the master node.

Alternatively, the source node is the master node, and the destination node is the child node.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be in various forms, for example, in a form of an analog circuit, a digital circuit, or a dedicated circuit. However, as for this application, software program implementation is a better implementation in most cases. Based on such an understanding, the technical solutions of this application essentially or the part contributing to the conventional technology may be implemented in a form of a software product. The computer software product is stored in a readable storage medium such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods described in embodiments of this application.

All or some of the foregoing embodiments may be implemented by using software, hardware, firmware, or any combination thereof. When software is used to implement embodiments, all or some of embodiments may be implemented in a form of a computer program product.

The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A method for processing a control packet, wherein the method comprises:

forwarding, by a first switch of a switch network, a query packet transmitted by a source node to a destination node, wherein a packet header of the query packet includes an in-network computing tag (INC Tag) and a communicator identifier, the INC Tag includes an INC Tag low and an INC Tag high, the INC Tag low and the INC Tag high indicate that the query packet is an INC packet, the communicator identifier identifies a communicator serving a group of communication processes in a collective communication system, the collective communication system comprises the switch network, the source node, and the destination node, the query packet is used to query an in-network computing capability of the switch network, and the query packet is generated by the source node based on a context of the communicator;

receiving, by the first switch and in response to forwarding the query packet to the destination node, a notification packet transmitted by the destination node to the source node, wherein the notification packet carries the in-network computing capability of the switch network; and forwarding, by the first switch, the notification packet transmitted by the destination node to the source node.

2. The method according to claim 1, wherein forwarding, by the first switch, the query packet transmitted by the source node to the destination node comprises:

adding, by the first switch when receiving the query packet, an in-network computing capability of the first switch to the query packet; and forwarding, by the first switch to the destination node, the query packet to which the in-network computing capability of the first switch is added.

3. The method according to claim 2, wherein the in-network computing capability of the first switch comprises at least one of a collective operation type or a data type supported by the first switch.

4. The method according to claim 3, wherein the in-network computing capability of the first switch comprises a size of a remaining available resource for in-network computing of the first switch.

5. The method according to claim 1, wherein the method further comprises:

establishing, by the first switch, an entry based on a hop count of the query packet, wherein the entry is used by the first switch to perform computing offloading on service packets.

6. The method according to claim 1, wherein the switch network comprises upper-layer switches and a lower-layer switch, and the first switch is the lower-layer switch; and wherein forwarding, by the first switch, the notification packet transmitted by the destination node to the source node comprises:

determining, by the first switch, a target switch from the upper-layer switches based on sizes of remaining available resources for in-network computing of the upper-layer switches;

adding, by the first switch, a size of a remaining available resource for in-network computing of the target switch to the notification packet; and forwarding, by the first switch to the source node, the notification packet to which the size of the remaining available resource for in-network computing of the target switch is added.

7. The method according to claim 6, wherein determining, by the first switch, the target switch from the upper-layer switches based on the sizes of the remaining available resources for in-network computing of the upper-layer switches comprises:

determining, by the first switch, the target switch from the upper-layer switches by using a load balancing policy based on the sizes of the remaining available resources for in-network computing of the upper-layer switches.

8. The method according to claim 6, wherein the method further comprises:

sending, by the first switch, a switch query packet to an upper-layer switch, wherein the switch query packet is used to query a size of a remaining available resource for in-network computing of the upper-layer switch; and receiving, by the first switch, a switch notification packet sent by the upper-layer switch, wherein the switch notification packet is used to notify the size of the remaining available resource for in-network computing of the upper-layer switch to the first switch.

9. The method according to claim 1, wherein the switch network comprises an upper-layer switch and a lower-layer switch, and the first switch is the upper-layer switch, and wherein the method further comprises:

receiving, by the first switch, a switch query packet sent by the lower-layer switch, wherein the switch query packet is used to query a size of a remaining available resource for in-network computing of the first switch; and sending, by the first switch, a switch notification packet to the lower-layer switch, wherein the switch notification packet is used to notify the size of the remaining available resource for in-network computing of the first switch to the lower-layer switch.

10. A switch, comprised in a switch network, comprising:
at least one processor; and
a non-transitory computer-readable storage medium comprising computer-executable instructions which, when executed by the at least one processor, cause the switch to perform operations comprising:

forwarding a query packet transmitted by a source node to a destination node, wherein a packet header of the query packet includes an in-network computing tag (INC Tag) and a communicator identifier, the INC Tag includes an INC Tag low and an INC Tag high, the INC Tag low and the INC Tag high indicate that the query packet is an INC packet, the communicator identifier identifies a communicator serving a group of communication processes in a collective communication system, the collective communication system comprises the switch network, the source node, and the destination node, the query packet is used to query an in-network computing capability of the switch network, and the query packet is generated by the source node based on a context of the communicator;

receiving a notification packet transmitted by the destination node to the source node in response to forwarding the query packet to the destination node, wherein the notification packet carries the in-network computing capability of the switch network; and forwarding the notification packet transmitted by the destination node to the source node.

11. The switch according to claim 10, wherein forwarding the query packet transmitted by the source node to the destination node comprises:

adding, when receiving the query packet, an in-network computing capability of the switch to the query packet; and forwarding, to the destination node, the query packet to which the in-network computing capability of the switch is added.

12. The switch according to claim 11, wherein the in-network computing capability of the switch comprises at least one of a collective operation type or a data type supported by the switch.

13. The switch according to claim 11, wherein the in-network computing capability of the switch comprises a size of a remaining available resource for in-network computing of the switch.

14. The switch according to claim 10, wherein the operations further comprise:

establishing an entry based on a hop count of the query packet, wherein the entry is used by the switch to perform computing offloading on service packets.

15. The switch according to claim 10, wherein the switch network comprises upper-layer switches and a lower-layer switch, and the switch is the lower-layer switch; and wherein forwarding the notification packet transmitted by the destination node to the source node comprises:

determining a target switch from the upper-layer switches based on sizes of remaining available resources for in-network computing of the upper-layer switches;

adding a size of a remaining available resource for in-network computing of the target switch to the notification packet; and forwarding, to the source node, the notification packet to which the size of the remaining available resource for in-network computing of the target switch is added.

16. The switch according to claim 15, wherein determining the target switch from the upper-layer switches based on the sizes of the remaining available resources for in-network computing of the upper-layer switches comprises:

determining the target switch from the upper-layer switches by using a load balancing policy based on the sizes of the remaining available resources for in-network computing of the upper-layer switches.

17. The switch according to claim 15, wherein the operations further comprise:

sending a switch query packet to an upper-layer switch, wherein the switch query packet is used to query a size of a remaining available resource for in-network computing of the upper-layer switch; and receiving a switch notification packet sent by the upper-layer switch, wherein the switch notification packet is used to notify the size of the remaining available resource for in-network computing of the upper-layer switch to the switch.

18. The switch according to claim 10, wherein the switch network comprises an upper-layer switch and a lower-layer switch, and the switch is the upper-layer switch, and wherein the operations further comprise:

receiving a switch query packet sent by the lower-layer switch, wherein the switch query packet is used to query a size of a remaining available resource for in-network computing of the switch; and sending a switch notification packet to the lower-layer switch, wherein the switch notification packet is used to notify the size of the remaining available resource for in-network computing of the switch to the lower-layer switch.

19. A collective communication system, wherein:
the collective communication system comprises a switch network and a plurality of computing nodes, the switch network comprises a first switch, and the plurality of computing nodes comprise a first computing node and a second computing node;
the second computing node is configured to generate a query packet based on a context of a communicator serving a group of communication processes in the collective communication system, wherein a packet header of the query packet includes an in-network computing tag (INC Tag) and a communicator identifier identifying the communicator, the INC Tag includes an INC Tag low and an INC Tag high, the INC Tag low and the INC Tag high indicate that the query packet is an INC packet, and the query packet is used to query an in-network computing capability of the switch network;
the first switch is configured to forward the query packet transmitted by the second computing node to the first computing node;
the first computing node is configured to generate a notification packet in response to receiving the query packet, wherein the notification packet carries the in-network computing capability of the switch network; and
the first switch is further configured to forward the notification packet transmitted by the first computing node to the second computing node.

20. The collective communication system according to claim 19, wherein forwarding the query packet transmitted by the second computing node to the first computing node comprises:
adding, when receiving the query packet, an in-network computing capability of the first switch to the query packet; and
forwarding, to the first computing node, the query packet to which the in-network computing capability of the first switch is added.

* * * * *